(12) United States Patent
Jiang et al.

(10) Patent No.: US 9,395,898 B2
(45) Date of Patent: Jul. 19, 2016

(54) ELECTRONIC DEVICE AND METHOD FOR CONTROLLING THE SAME

(71) Applicant: Lenovo (Beijing) Co., Ltd., Beijing (CN)

(72) Inventors: Xingping Jiang, Beijing (CN); Renjie Wang, Beijing (CN); Ziyan Sun, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 33 days.

(21) Appl. No.: 14/105,767

(22) Filed: Dec. 13, 2013

(65) Prior Publication Data

US 2014/0168122 A1    Jun. 19, 2014

(30) Foreign Application Priority Data

Dec. 14, 2012  (CN) .......................... 2012 1 0546574
Dec. 27, 2012  (CN) .......................... 2012 1 0581498
Jan. 7, 2013   (CN) .......................... 2013 1 0005070

(51) Int. Cl.
  *G06F 3/041*    (2006.01)
  *G06F 3/0485*   (2013.01)
  *G06F 3/0482*   (2013.01)

(52) U.S. Cl.
  CPC .......... *G06F 3/0485* (2013.01); *G06F 3/0482* (2013.01)

(58) Field of Classification Search
  None
  See application file for complete search history.

(56) References Cited

U.S. PATENT DOCUMENTS

| 8,677,283 | B2 * | 3/2014 | Fong ..................... G06F 3/0485 345/173 |
| 2008/0022228 | A1 * | 1/2008 | Kwon ................. G06F 3/04817 715/838 |
| 2010/0225607 | A1 * | 9/2010 | Kim ............................ 345/173 |
| 2012/0212418 | A1 * | 8/2012 | Shiota ......................... 345/168 |
| 2013/0104079 | A1 * | 4/2013 | Yasui ................... G06F 3/0482 715/834 |

* cited by examiner

*Primary Examiner* — Joseph Haley
*Assistant Examiner* — Ifedayo Iluyomade
(74) *Attorney, Agent, or Firm* — Harness, Dickey & Pierce, P.L.C.

(57) ABSTRACT

An electronic device and a method for controlling the same are provided. The method includes: displaying a first operating region, with M first operation objects being arranged on the first operating region; selecting, when a first operation is detected, the i-th first operation object from the M first operation objects in response to the first operation; determining second operating region based on a display position and a display direction of the i-th first operation object; displaying a second operating region, with N second operation objects being arranged on the second operating region, and the display direction of the q-th second operation object of the N second operation objects being identical to the display direction of the i-th first operation object.

28 Claims, 22 Drawing Sheets

ELECTRONIC DEVICE AND METHOD FOR CONTROLLING THE SAME

CROSS REFERENCE TO RELATED APPLICATION

The present invention claims the priority to Chinese Patent Application No. 201210546574.X, filed with the Chinese Patent Office on Dec. 14, 2012, entitled as "ELECTRONIC DEVICE AND METHOD FOR CONTROLLING THE SAME", the entire contents of which is incorporated herein by reference in its entirety.

The present invention claims the priority to Chinese Patent Application No. 201310005070.1, filed with the Chinese Patent Office on Jan. 7, 2013, entitled as "DISPLAYING METHOD AND ELECTRONIC DEVICE", the entire contents of which is incorporated herein by reference in its entirety.

The present invention claims the priority to Chinese Patent Application No. 201210581498.6, filed with the Chinese Patent Office on Dec. 27, 2012, entitled as "DISPLAY METHOD AND ELECTRONIC DEVICE", the entire contents of which is incorporated herein by reference in its entirety.

BACKGROUND

1. Field of the Disclosure

The disclosure relates to the field of electronic technology, and particularly to an electronic device and a method for controlling the same.

2. Background of the Technology

With the development of electronic technology, various electronic products come into being, especially consumer electronic devices, such as tablet computers, large-size tablet computers, smart phones, laptops.

To make it convenient for the users to operate the electronic device, various navigation modes, such as a hierarchical menu, a hierarchical folder, are designed in the prior art. In normally, only the top-level menu in the hierarchical menu is displayed, then top-level menu is clicked on by the user and the sub-menu is presented, and these menus are generally embedded in a specific application, such as various menus in the WORD software. A multi-level folder is usually referred to a logical partition of a storage unit, and the file wanted is found by clicking on the multi-level folder layer by layer.

However, in the modes described above, firstly once the hierarchical menu is embedded a specific application, the position of the first-level menu is fixed, and also the position and direction of a second-level menu are fixed, which means that the position and direction of the second-level menu will not be affected due to the change of the position and the direction of the first-level menu. For the multi-level folder mode, the direction of the folder itself can not be changed without the change of the direction of the electronic device. Therefore, when using these navigation modes from different directions of the electronic device, people will feel inconvenient, especially for the large-size tablet computer, because when the large-size tablet computer is in a multi-user multi-directional mode, the user' demands for navigating from different direction and different position can not be satisfied if a navigation mode in which the positions and directions of the navigation icons are unchangeable is used.

SUMMARY

Embodiments of the disclosure provide an electronic device and a method for controlling the same, to solve the technical problem in the prior art that user's demands for navigating from different directions and different positions can not be satisfied due to a navigation mode that both the position and the direction of navigation icons are unchangeable.

An aspect of the disclosure provides a method for controlling an electronic device applied to an electronic device, the electronic device includes a display unit, and the method includes: displaying a first operating region on the display unit, with M first operation objects being arranged on the first operating region, where M is an integer greater than or equal to 1; selecting an i-th first operation object from the M first operation objects in response to a first operation in the case where the first operation is detected, where i is any integer between 1 and M; determining a second operating region based on a display position and a display direction of the i-th first operation object on the display unit; and displaying the second operating region, with N second operation objects being arranged on the second operating region, and a display direction of a q-th second operation object of the N second operation objects being identical to the display direction of the i-th first operation object, where N is an integer greater than or equal to 1, and q is an integer greater than or equal to 1 and less than or equal to N, wherein the display position of the i-th first operation object is a first display position and the display direction of the i-th first operation object is a first display direction in the case where the first operating region is located at a first position on the display unit; the display position of the i-th first operation object is a second display position and the display direction of the i-th first operation object is a second display direction in the case where the first operating region is located at a second position on the display unit, and the first display direction is different from the second display direction.

Optionally, in a case that the display unit supports multi-touch, after the displaying a first operating region, the method further includes: selecting a j-th first operation object from the M first operation objects in response to a second operation in the case where a second operation is detected, wherein the j-th first operation object is adjacent to the i-th first operation object, and j is any integer between 1 and M which is different from i; determining a fourth operating region based on a display position and a display direction of the j-th first operation object on the display unit; displaying the fourth operating region, with S second operation objects being arranged on the fourth operating region, and the display direction of a k-th second operation object of the S second operation objects being identical to the display direction of the j-th operation object, wherein the fourth operating region is not completely overlapped with the second operating region, S is an integer greater than or equal to 1, and k is an integer greater than or equal to 1 and less than or equal to S, wherein the display position of the j-th first operation object is a third display position and the display direction of the j-th first operation object is a third display direction in the case where the first operating region is located at the first position; the display position of the j-th first operation object is a fourth display position and the display direction of the j-th first operation object is a fourth display direction in the case where the first operating region is located at the second position, and the third display direction is different from the fourth display direction.

Optionally, displaying a first operating region corresponding to the first operation includes: displaying at least one of name and icon of each of the M first operation objects; and displaying the second operating region includes: displaying at least one of name and icon of each of the N second operation objects.

Optionally, after displaying the second operating region, the method further includes: determining N preview areas respectively corresponding to the N second operation objects based on the display position and the display direction of each of the N second operation objects; and displaying the N preview areas, wherein each of the N preview areas displays thereon at least one preview file corresponding to a corresponding one of the N second operation objects.

Optionally, after displaying the N preview areas, the method further includes: selecting a p-th second operation object from the N second operation objects in response to a third operation in the case where the third operation is detected, where p is any integer between 1 and N; and changing a preview area corresponding to the p-th second operation object in the N preview areas into a selectable area.

Optionally, N second operation objects being arranged at the second operating region includes:

displaying the N second operating objects on the second operating region, wherein each of the N second operating objects corresponds to a first operating sub-region, each first operating sub-region has a reference point, a connecting line of N reference points is a curve, and rules for determining the reference point on different first operating sub-regions are the same.

Optionally, the reference point on each first operating sub-region is:

a center point of each first operating sub-region; or a point on each first operating sub-region which is furthest or nearest to a center of the first operating region; or a top point of each first operating sub-region.

Optionally, displaying the N second operating objects on the second operating region includes:

determining the N reference points;

determining a trace corresponding to the curve;

aligning the N reference points along the trace; and displaying the N second operating objects.

Optionally, a distance between the curve and external borders of the first operating region meet a predetermined condition.

Optionally, a second operating sub-region is further formed on the second operating region, the second operating sub-region is located between the first operating region and the first operating sub-region, and after determining a second operating region the method further includes:

displaying L third operating objects on the second operating sub-region, where L is an integer greater than or equal to 1.

Optionally, the method further including:

determining a third operation region based on the i-th first operation object; and displaying the third operation region, wherein L third operation objects are arranged at the third operation region, with L being an integer greater than or equal to 1 and less than or equal to N.

Optionally, the second operation region has a main region for displaying a second operation object corresponding to a selected third operation object, and after displaying the second operation region and the third operation region, the method further includes:

obtaining a second operation by detecting, wherein the second operation is an operation to click a j-th third operation object of the L third operation objects;

selecting the j-th third operation object in response to the second operation, with j being any integer ranging from 1 to L; and displaying the second operation object corresponding to the j-th third operation object in the main region.

Optionally, by selecting the j-th third operation object, the method further includes:

displaying the j-th third operation object with a first effect and displaying other third operation object of the L third operation objects other than the j-th third operation object with a second effect, wherein the first effect is different from the second effect.

Optionally, the size of the third operation region is fixed and G third operation objects are displayed on the third operation region at a time, with G being an integer greater than or equal to 1, and wherein, in the case where L is larger than G, after displaying the second operation region and the third operation region, the method further includes:

obtaining a third operation by detecting; and adjusting the third operation objects displayed in the third display region in response to the third operation, wherein at least one operation object of the adjusted third operation objects is different from the third operation objects displayed in the third operation region before the adjustment, and the second operation objects displayed in the second operation region remain unchanged.

Optionally, in the case where the third operation is a sliding operation and a 1th third operation object is slid, after in response to the third operation, the method further includes:

detecting whether a sliding distance of the sliding operation on the display unit is larger than a predetermined value; and displaying again, in the third operation region, the third operation objects displayed in the third operation region before the adjustment if the sliding distance is larger than the predetermined value.

Another aspect of the disclosure provides an electronic device including: a display unit, configured to display a first operating region, with M first operation objects being arranged on the first operating region, where M is an integer greater than or equal to 1; a detection unit, configured to detect whether there is a first operation; and a processing unit, configured to select a i-th first operation object from the M first operation objects in response to the first operation in the case where the first operation is detected and obtained, where i is any integer between 1 and M; determine a second operating region based on a display position and a display direction of the i-th first operation object on the display unit; control to display the second operating region on the display unit, wherein N second operation objects are arranged on the second operating region, and a display direction of a q-th second operation object of the N second operation objects is identical to the display direction of the i-th first operation object, where N is an integer greater than or equal to 1, and q is an integer greater than or equal to 1 and less than or equal to N, wherein the display position of the i-th first operation object is a first display position and the display direction of the i-th first operation object is a first display direction in the case where the first operating region is located at a first position on the display unit; the display position of the i-th first operation object is a second display position and the display direction of the i-th first operation object is a second display direction in the case where the first operating region is located at a second position on the display unit, and the first display direction is different from the second display direction.

Optionally, in a case that the display unit supports multi-touch, the detection unit is further configured to detect whether there is a second operation; and the processing unit is further configured to: select a j-th first operation object from the M first operation objects in response to the second operation in the case where the second operation is detected, the j-th first operation object being adjacent to the i-th first operation object, and j being any integer between 1 and M which is different from i; determine a fourth operating region based on a display position and a display direction of the j-th first operation object on the display unit; control to display the fourth operating region on the display unit, with S second operation objects being arranged at the fourth operating region, and the display direction of the k-th second operation object of the S second operation objects being identical to the display direction of the j-th first operation object, wherein the fourth operating region is not completely overlapped with the second operating region, S is an integer greater than or equal to 1, and k is an integer greater than or equal to 1 and less than or equal to S, wherein the display position of the j-th first operation object is a third display position and the display direction of the j-th first operation object is a third display direction in the case where the first operating region is located at the first position; the display position of the j-th first operation object is a fourth display position and the display direction of the j-th first operation object is a fourth display direction in the case where the first operating region is located at the second position, and the third display direction is different from the fourth display direction.

Optionally, the processing unit is further configured to determine N preview areas respectively corresponding to the N second operation objects based on the display position and the display direction of each of the N second operation objects; and display the N preview areas, wherein at least one preview file corresponding to a corresponding one of the N second operation objects is displayed on each of the N preview areas.

Optionally, the detection unit is further configured to detect whether there is a third operation; and the processing unit is further configured to select a p-th second operation object from the N second operation objects in response to the third operation in the case where the third operation is detected, p being any integer between 1 and N; and perform control to change a preview area in the N preview areas corresponding to the p-th second operation into a selectable area.

Optionally, the detection unit is further configured to detect whether there is a fourth operation; and the processing unit is further configured to control to display a first operating region corresponding to the fourth operation on the display unit in response to the fourth operation in the case where the fourth operation is detected.

Optionally, the processing unit includes a first processing sub-unit, configured to select the i-th first operating object from the M first operating objects in response to the first operation in the case that the first operation is obtained, where i is any integer between 1 and M; determine a second operating region and N second operating objects based on the ith first operating object, wherein the second operating region is different from the first operating region; and control to display the N second operating objects on the second operating region, wherein when the N second operating objects are displayed on the second operating region, each of the N second operating objects corresponds to a first operating sub-region, each first operating sub-region has a reference point, a connecting line of N reference points is a curve, and rules for determining the reference point on different first operating sub-regions are the same, where N is an integer greater than or equal to 1.

Optionally, the reference point on each first operating sub-region is:
 a center point of each first operating sub-region; or
 a point on each first operating sub-region which is furthest or nearest to a center of the first operating region; or
 a top point of each first operating sub-region.

Optionally, the first processing sub-unit includes a processing module configured to determine the N reference points, determine a trace corresponding to the curve, align the N reference points along the trace and display the N second operating objects.

Optionally, a distance between the curve and external borders of the first operating region meet a predetermined condition.

Optionally, the a second operating sub-region is further formed on the second operating region, the second operating sub-region is located between the first operating region and the first operating sub-region, and the first processing sub-unit is further configured to display L third operating objects on the second operating sub-region after the second operating region is determined, where L is an integer greater than or equal to 1.

Optionally, the processing unit includes a second processing sub-unit configured to select the i-th first operation object from the M first operation objects in response to the first operation, with i being any integer ranging from 1 to M; determine a second operation region and a third operation region based on the i-th first operation object; and to control the second operation region and the third operation region to be displayed by the display unit, wherein N second operation objects are arranged at the second operation region and L third operation objects are arranged at the third operation region, with N being an integer greater than or equal to 1 and L being an integer greater than or equal to 1 and less than or equal to N.

Optionally, the second operation region has a main region for displaying the second operation object corresponding to the selected third operation object, and after the second operation region and the third operation region are controlled to be displayed by the display unit:
 the detection unit is further configured to detect and obtain a second operation, wherein the second operation is an operation to click the j-th third operation object of the L third operation objects; and
 the second processing sub-unit is further configured to select the j-th third operation object in response to the second operation, with j being any integer ranging from 1 to L; and to control the second operation object corresponding to the j-th third operation object to be displayed in the main region.

Optionally, the second processing sub-unit is further configured to control the j-th third operation object to be displayed with a first effect and control other third operation object of the L third operation objects other than the j-th third operation object to be displayed with a second effect, wherein the first effect is different from the second effect.

Optionally, the size of the third operation region is fixed and G third operation objects are displayed in the third operation region at a time, with G being an integer greater than or equal to 1, and
 wherein, in the case where L is larger than G, after the second operation region and the third operation region are displayed:
 the detection unit is further configured to detect and obtain a third operation; and the second processing sub-unit is further configured to adjust the third operation objects displayed in the third display region in response to the third operation, wherein at least one operation object of the adjusted third operation objects is different from the third operation objects displayed in the third operation region before the adjustment, and the second operation objects displayed in the second operation region remain unchanged.

Optionally, in the case where the third operation is a sliding operation and the 1th third operation object is slid, after in response to the third operation the second processing sub-unit is further configured to:

detect whether the sliding distance of the sliding operation on the display unit is larger than a predetermined value; and display again the third operation objects displayed in the third operation region before the adjustment in the third operation region if the sliding distance is larger than the predetermined value.

In one embodiment of the disclosure, a first operating region is displayed on a display unit, and M first operation objects, such as previous menu items or folders, are arranged at the first operating region, and the electronic device gives a response to a first operation (for example when the user presses on the i-th menu item or clicks on the i-th folder) to select an i-th first operation object that is selected by a user in the case where first operation is detected, and determines a second operating region based on a display position and a display direction of the i-th operation object on the display unit, then displays the second operating region on the display unit, with N second operation objects, such as sub-menu items of the i-th menu item or files in the i-th folder or other related contents, being arranged at the second operating region, wherein the display direction of a q-th second operation object of the N second operation objects is identical to the display direction of the i-th first operation object, and wherein the display position of the i-th first operation object is a first display position and the display direction of the i-th first operation object is a first display direction in the case where the first operating region is located at a first position on the display unit; the display position of the i-th first operation object is a second display position and the display direction of the i-th first operation object is a second display direction in the case where the first operating region is located at a second position on the display unit, and the first display direction is different from the second display direction, i.e., the first operating region can be moved or rotated on the display unit, and the position and direction of the second operating region are determined according to the display position and the display direction of the i-th first operation object in the first operating region and the display position and the display direction of the i-th first operation object are changed as the change of the first operating region. Therefore, by the technical solution of this embodiment, the navigation components can be moved or rotated on the display unit freely, and the position and the direction of the second operating region (sub-menus, sub-files) can be changed as the change of the position and direction of the first operating region (previous menus, previous folders), therefore, the usage requirements for multi-user and multi-direction can be satisfied.

Further, in the embodiment of the disclosure, when a second electronic device, such as a USB disk or a portable hard disk, is connected to the electronic device, files in the second electronic device can also be organized as the navigation icons and the navigation mode described in the above embodiment, which may be provided in an additionally set navigation system or may also be integrated into the original navigation system of the electronic device. In this way, consistency of product design can be kept, and the use requirements for multi-user and multi-direction can also be satisfied.

Further, in order to solve a technical problem that in use, the distance that the finger of the user moves is far due to the far distance between the second operating region and the i-the first operation object, thus inconvenience and insufficient logicality is caused, especially in the case of large-size tablet computers in which the user may need to move for a certain distance to perform an operation if the distance described above is too far, the technical solution that the second operating region is arranged in the periphery of the first operating region and extends toward to its opposite ends from its centre and the centre of the first operating region, and the centre of the i-th first operation object and the centre of the second operating region lie on a same straight line is adopted, thus logicality between the second operating region and the i-th first operation object is fully reflected, and since the second operating region is close to the i-th first operation object, the user does not need to move for a long distance to operate the second operating region in the case where the i-th first operation object is selected, therefore, the convenience of use is improved.

According to an embodiment of the disclosure, the first operating region is displayed on the display unit; M first operating objects are arranged at the first operating region, such as a upper-level menu entry or folder; in the case where the first operation is obtained, for example, the user presses the i-th menu entry or clicks the i-th folder, an electronic device is configured to, in response to the first operation, select the i-th first operating object selected by the user, and determine the second operating region and N second operating objects based on the i-th first operating object, and then display the N second operating objects on the second operating region, such as lower-level menu entry of the i-th menu entry, the files in the i-th folder, or other related contents; and when the N second operating objects are displayed on the second operating region, each of the N second operating objects corresponds to a first operating sub-region, each first operating sub-region has a reference point, a connecting line of N reference points is a curve, and rules for determining the reference point on different first operating sub-regions are the same, where N is an integer greater than or equal to 1. Thus, with the technical solutions in the embodiments, the operating objects can be arranged along a curve. That is, at least one of the connecting lines of the reference points is a curve, and that is, the operating objects may have different shapes and sizes; even the shapes and the sizes are the same respectively, the operating objects are arranged along a curve, so that the displaying manner for the operating object is enriched and diversified, and the experience of the user is further improved.

Further, in an embodiment of the disclosure, a shape of the connecting line of the reference points, i.e., the curve, is corresponding to that of the first operating region, therefore, the consistence of product design is ensured.

Further, in an embodiment of the disclosure, a second operating sub-region is further formed on the second operating region, the second operating sub-region is located between the first operating region and the first operating sub-region, and L third operating objects are displayed on the second operating sub-region. With the method according to this embodiment, when one first operating object is selected, two operating regions related to the first operating object will be popped up, with each operating region has an corresponding operating object displayed thereon, so that it is unnecessary for the user to click twice, the electronic device will pop up two operating regions in response to an operation as long as it receives this operation, and thus the efficiency of human-computer interaction is improved.

Further, in an embodiment of the disclosure, the L third operating objects on the second operating sub-region are index entries of the N second operating objects. With the method according to this embodiment, in the case where one first operating object is clicked, the second operating object and the index entry of the second operating object will be popped up at the same time, that is, two levels of menus will be presented at the same time, so that the organizational structure between the operating objects can be embodied entirely, the management of the electronic device to the operating object is facilitated, and the operation of the user is facilitated. For example, if the number of the second operating objects is huge, the user can search in accordance with the index entry, but not pay much time to search among the large number of second operating objects.

According to the embodiment of the disclosure, the first operation region is displayed by the display unit. The M first operation objects, such as upper-level menu items or file folders, are arranged at the first operation region. In the case where the first operation is detected and obtained, for example, when the user presses the i-th menu item or clicks the i-th file folder, the electronic device may select the i-th first operation object selected by the user in response to the first operation, determine the second operation region and the third operation region based on the i-th first operation object, and display the second operation region and the third operation region on the display unit. The N second operation objects, such as lower-level menu items of the i-th menu item, files in the i-th file folder or other related content, are arranged at the second operation region. The L third operation objects also related to the i-th first operation object are arranged in the third operation region. It can be seen from the embodiment of the method that two operation regions related to a first operation object may be popped up in the case where the first operation object is selected, and there is a corresponding operation object in each of the two operation regions. Therefore, it is unnecessary for the user to click twice and the electronic device may only receive one operation, and then two operation regions may be popped up in response to the operation, thereby improving the efficiency of human-computer interaction.

Furthermore, according to the embodiment of the disclosure, the L third operation objects in the third operation region are the index entries of the N second operation objects. In the embodiment of the method, both the second operation objects and the index entries of the second operation objects may be popped up after a first operation object is clicked, i.e. two levels of menus may appear simultaneously. Therefore, the organizational structure of the operation objects may be embodied entirely, facilitating the electronic device to manage the operation objects and facilitating the operation of the user. For example, in the case of a very large number of the second operation objects, the user may search in accordance with the index entries without spending a lot of time in searching among the large number of second operation objects.

Furthermore, according to the embodiment of the disclosure, the display of the second operation object may be configured to make the second operation object corresponding to the j-th third operation object displayed in the second operation region, in the case where the j-th third operation object is selected. That is, the display status of the second operation object may be changed by clicking the third operation object. Therefore, according to the embodiment of the method, the display status of the second operation object may be adjusted rapidly by selecting the third operation object, and the second operation object corresponding to the selected third operation object may be rapidly displayed in the second operation region.

Furthermore, according to the embodiment of the disclosure, the second operation object displayed in the second operation region remains unchanged in the case where the third operation object displayed in the third operation region is adjusted in response to a trigger action. That is, the second operation region is not synchronously changed with the changing of the third operation object displayed in the third operation region, thereby avoiding poor system performance caused by large number of files being loaded in the second operation region.

Furthermore, according to the embodiment of the disclosure, the display status of the third operation object in the third operation region may be synchronously changed in the case where the second operation object displayed in the main region of the second operation region is changed. Hence, it's clearly shown that which of the third operation objects is the one corresponding to the second operation object displayed in the main region. Moreover, L is less than or equal to N, and usually N is much larger than L. Because of such synchronous change, on one hand, it is possible for the user to know the corresponding relationship between the second operation object and the third operation object; on the other hand, there is no bad influence on the system performance of the electronic device.

DETAILED DESCRIPTION

Figure 1:
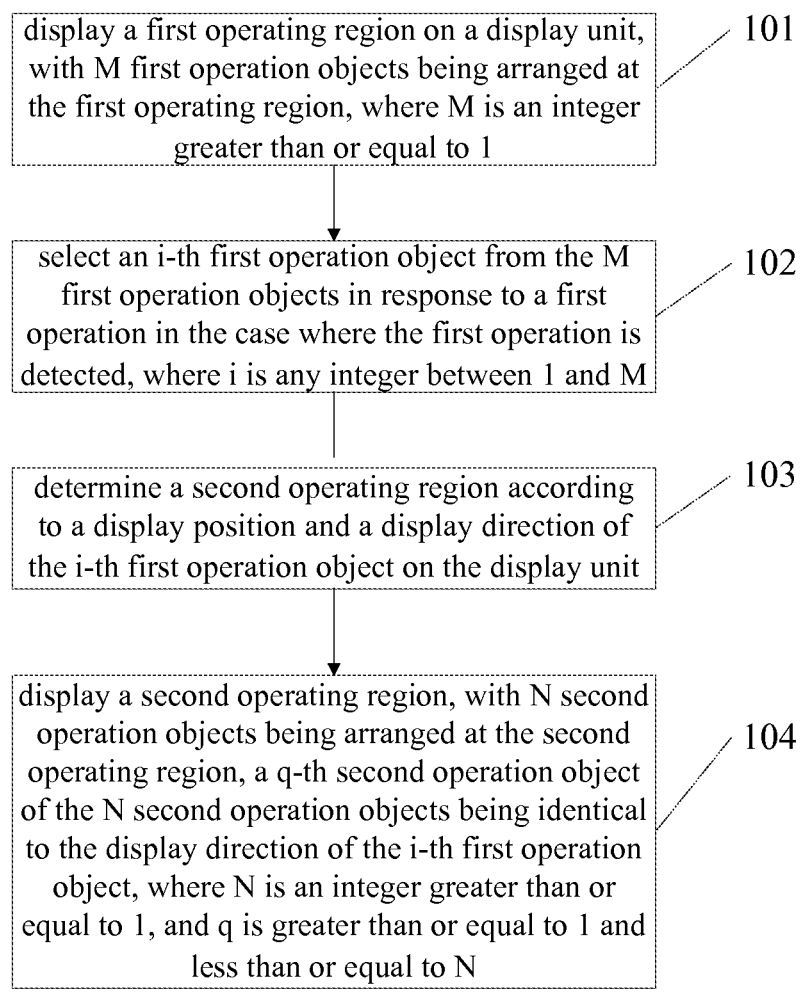
FIG. 1 is a flowchart of a method for controlling an electronic device according to an embodiment of the disclosure.

To give those skilled in the art a better understanding of the technical solutions in the disclosure, in the following, the technical solutions in the embodiments of the disclosure will be described clearly and completely in conjunction with the accompanying drawings in the embodiments of the disclosure. Apparently, the described embodiments are just a part of embodiments of the disclosure, rather than all embodiments. Based on the embodiments of the disclosure, all other embodiments obtained by those skilled in the art without any creative work will fall within the scope of protection of the disclosure.

Embodiments of the disclosure provide an electronic device and a method for controlling the same, to solve the technical problem in the prior art that user's demands for navigating from different directions and different positions can not be satisfied due to a navigation mode that both the position and the direction of navigation icons are unchangeable.

In an embodiment of the disclosure, a first operating region is displayed on a display unit, and M first operation objects, such as previous menu items or folders, are arranged at the first operating region, and in the case that a first operation is detected, the electronic device gives a response to the first operation (for example when an user presses on the i-th menu item or clicks on the i-th folder) to select the i-th first operation object that is selected by the user, and determines a second operating region based on a display position and a display direction of the i-th first operation object on the display unit, then displays the second operating region on the display unit, with N second operation objects, such as sub-menu items of the i-th menu item or files in the i-th folder or other related contents, being arranged at the second operating region, where the display direction of a q-th second operation object of the N second operation objects is identical to that of the i-th first operation object, and where in the case that the first operating region is located at a first position on the display unit, the display position of the i-th first operation object is a first display position and the display direction of the i-th first operation object is a first display direction; in the case that the first operating region is located at a second position on the display unit, the display position of the i-th first operation object is a second display position and the display direction of the i-th first operation object is a second display direction, and the first display direction is different from the second display direction. That is, the first operating region can be moved or rotated on the display unit. The position and direction of the second operating region are determined according to the display position and the display direction of the i-th first operation object in the first operating region and the display position and the display direction of the i-th first operation object changes with the change of the first operating region. Therefore, by applying the technical solution of this embodiment, the navigation components can be moved or rotated on the display unit freely, and the position and the direction of the second operating region (sub-menus, sub-files) can change with the change of the position and direction of the first operating region (previous menus, previous folders), thereby the use requirements for multi-user and multi-direction can be satisfied.

Further, in an embodiment of the disclosure, when a second electronic device, such as a USB disk or a portable hard disk, is connected to the electronic device, files in the second electronic device may also be organized like the navigation icons and the navigation mode described in the above embodiment, which can be provided in one additionally created navigation system or may also be integrated into the original navigation system of the electronic device. In this way, consistency of product design can be kept, and the use requirements for multi-user and multi-direction can also be satisfied.

To understand the above technical solution better, the above technical solutions will be illustrated hereinafter in detail in conjunction with accompanying drawings and specific embodiments.

An embodiment of the disclosure provides a method for controlling an electronic device applied to an electronic device, such as a conventional tablet computer, a large-sized tablet computer, or other electronic devices supporting the multi-user and multi-direction operation. The electronic device includes a display unit.

Reference is made to FIG. 1 which shows a flowchart of a method for controlling an electronic device according to the embodiment, the method includes:

step 101: displaying a first operating region on the display unit, with M first operation objects being arranged on the first operating region, where M is an integer greater than or equal to 1;

step 102: selecting, the i-th first operation object from the M first operation objects in response to a first operation if the first operation is detected, where i is any integer between 1 and M;

step 103: determining a second operating region based on a display position and a display direction of the i-th first operation object on the display unit; and step 104: displaying the second operating region, with N second operation objects being arranged at the second operating region, and the display direction of the q-th second operation object of the N second operation objects being identical to that of the i-th first operation object, where N is an integer greater than or equal to 1, and q is an integer greater than or equal to 1 and less than or equal to N.

The display position of the i-th first operation object is a first display position and the display direction of the i-th first operation object is a first display direction if the first operating region is located at a first position on the display unit; the display position of the i-th first operation object is a second display position and the display direction of the i-th first operation object is a second display direction if the first operating region is located at a second position on the display unit, and the first display direction is different from the second display direction.

At step 101, the first operating region is displayed. The first operating region may be in a shape of a circle, a rectangle, an oval or in any other shape. M first operation objects are arranged at the first operating region, and the first operation object may be a previous menu, i.e., a parent menu or a main menu, and may also be a folder or a file.

Further, the execution of step 101 may be that the first operating region is displayed on the display unit when the electronic device is started, or the first operating region is displayed on the display unit by a triggering operation after the electronic device has been started. For example, in a case that the first operating region is in a hidden state, and the first operating region is activated and displayed on the display unit if a user uses a finger to click on an edge region on the display unit; alternatively, when an external electronic device is connected to the electronic device, the first operating region is displayed, which is not limited in the disclosure.

After step 101 is performed, the first operating region is displayed on the display unit, and the electronic device performs step 102. The electronic detects whether there is a first operation, for example, whether at least one of the M first operation objects is clicked by an operation body or a cursor. And a response is made to the first operation to select the first operation object clicked by the operation body from the M first operation objects if a first operation is detected, such as the i-th first operation object, where i is any integer between 1 and M.

That the user selects the i-th first operation object indicates that the user wants to view or operate sub-menus or sub-files corresponding to the i-th first operation object, therefore at this time, a position where the sub-menus or the sub-files are to be displayed is needed to be determined, thus step 103 is performed. In the embodiment, a second operating region is determined based on the display position and the display direction of the i-th first operation object on the display unit, the second operating region is used to carry the sub-menus or the sub-files described above.

The display position of the i-th first operation object may be obtained by coordinates of the i-th first operation object on the display unit, and the display direction of the i-th first operation object may be obtained by an included angle between a reference edge and a straight line passing through the coordinates and a reference point or an angle offset from the reference point. Of course, in practical, the display position and the display direction of the i-th first operation object on the display unit may be determined in other ways, which is not limited in the disclosure.

Then, the second operating region is determined based on the display position and the display direction of the i-th first operation object on the display unit. For example, a position and a direction of the second operating region may be determined, and further the size of the second operating region may be determined.

Next, step 104 is performed, that is, the second operating region is displayed on the display unit, with N second operation objects being arranged at the second operating region. The N second operation objects are the sub-menus or the sub-files corresponding to the i-th first operation object. The second operating region is determined according to the display position and the display direction of the i-th first operation object on the display unit, further, the display direction of the q-th second operation object of the N second operation objects is the identical to that of the i-th first operation object, for example, an offset angle of the q-th second operation object with respect to a reference point is the same as an offset angle of the i-th first operation object with respect to the reference point.

In an embodiment, a position at which the q-th second operation object is located is the centre of the second operating region, and other second operation objects are symmetrically distributed on both sides of the q-th second operation object with the q-th second operation object being the centre. Of course, in other embodiments, the q-th second operation object may also be located at a starting position or an ending position of the second operating region.

To understand the implementation of the method in the embodiment of the disclosure better, detailed description is made hereinafter by a specific example and accompanying drawings.

Figure 2A:
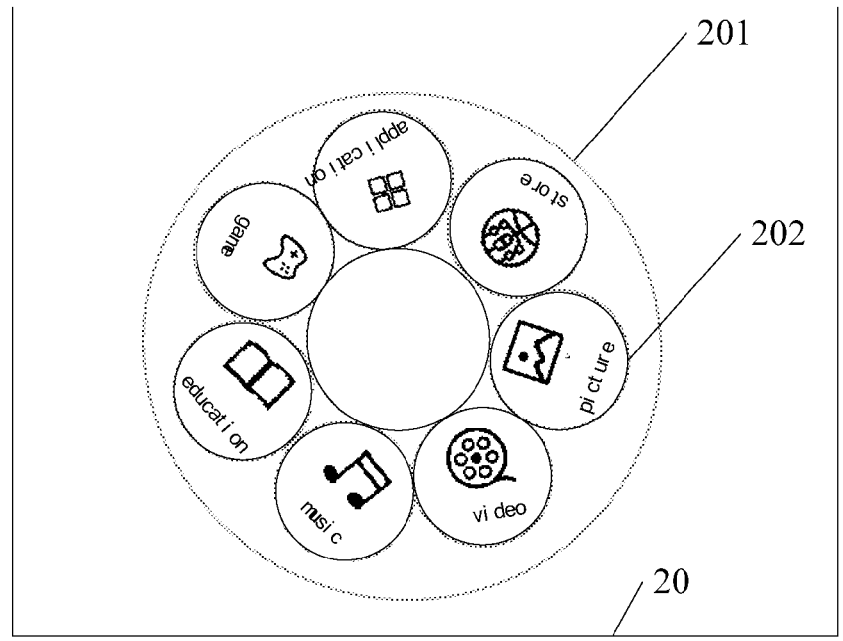
FIGS. 2a to 2e are schematic diagrams showing the control for an electronic device according to an embodiment of the disclosure.

Referring to FIG. 2a, the electronic device includes a display unit 20. Based on step 101, for example, a first operating region 201 is displayed on the display unit 20 after the electronic device is started, with 7 first operation objects being arranged at the first operating region 201. In the embodiment, the illustration is made by taking the operating region in a shape of a circle as an example, but in other embodiments, the first operating region may be in a shape of an oval, a rectangle or in any other shapes. The first operation objects may be picture, disclosure store, disclosure, game, education, music and video. Among these first operation objects, there are folders, such as the picture or the music, and also navigation menu items such as the disclosure. Of course, a first operation object corresponding to the disclosure may also be considered as a folder, and a folder may also be considered as a navigation menu item.

Next, the user may select a first operation object corresponding to the picture if the user wants to view the picture, i.e., a first operation object 202, by a finger or a touch-control pen or by a mouse, and at this time, the electronic device will perform step 102 to select the first operation object 202. For example, the first operation object may be highlighted or sink to indicate that it has been selected, then the user may know that the first operation object has been selected.

Next, step 103 is performed, that is, a second operating region is determined based on a display position and a display direction of the first operation object 202 on the display unit 20. For the acquisition of the display position of the first operation object 202, a coordinate value of the centre of the first operation object 202 may be directly acquired; and for the acquisition of the display direction of the first operation object 202, a direction that the centre of the first operating region 201, i.e., the circle centre, points to the centre of the first operation object 202 may be acquired as the display direction of the first operation object 202. Then, the second operating region is determined based on the display position and the display direction of the first operation object 202. In an embodiment, the position of a centre point of the second operating region may be determined according to the display position and the display direction of the first operation object 202, and the centre point is for example on the extension line formed from the circle centre to the centre of the first operation object 202; in addition, it may be assumed that the second operating region is displayed for example close to the first operating region 201, then the specific position of the centre of the second operating region may be decided by a preset width of the second operating region, and thus the second operating region may be determined. That is, in a case that the width of the second operating region is determined, no matter which position on the display unit the first operating region 201 moves to or whether the first operating region 201 is rotated or which direction the first operating region 201 is in, the second operating region may be determined based on the display position and the display direction of the first operation object 202.

Figure 2B:
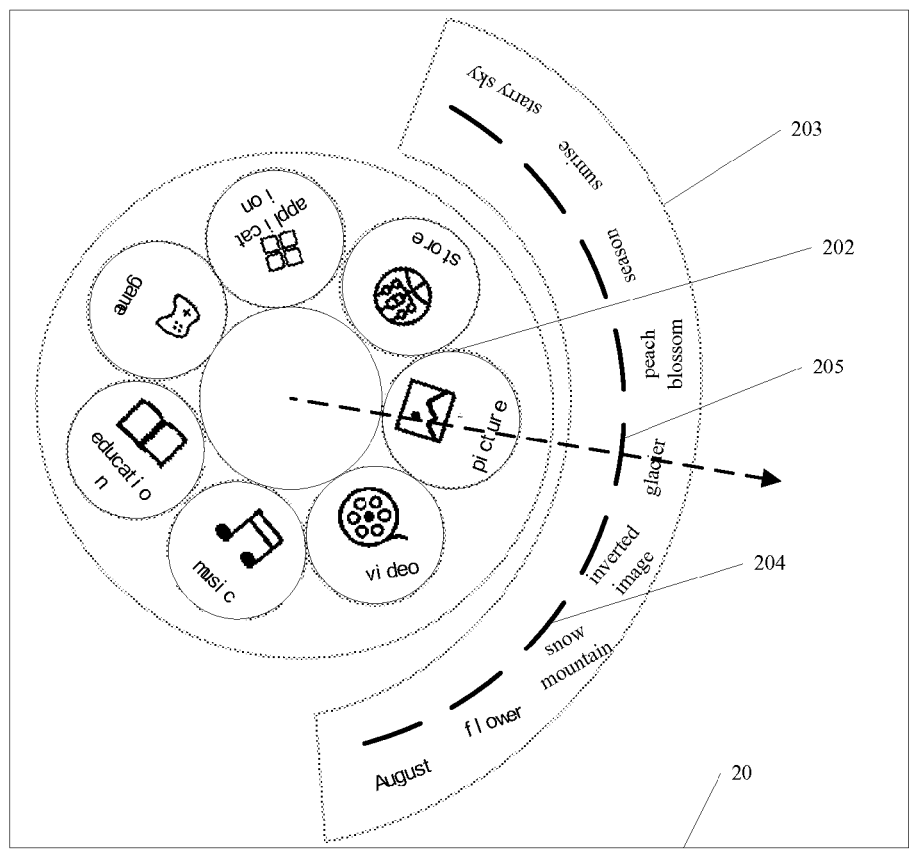
Figure 9:
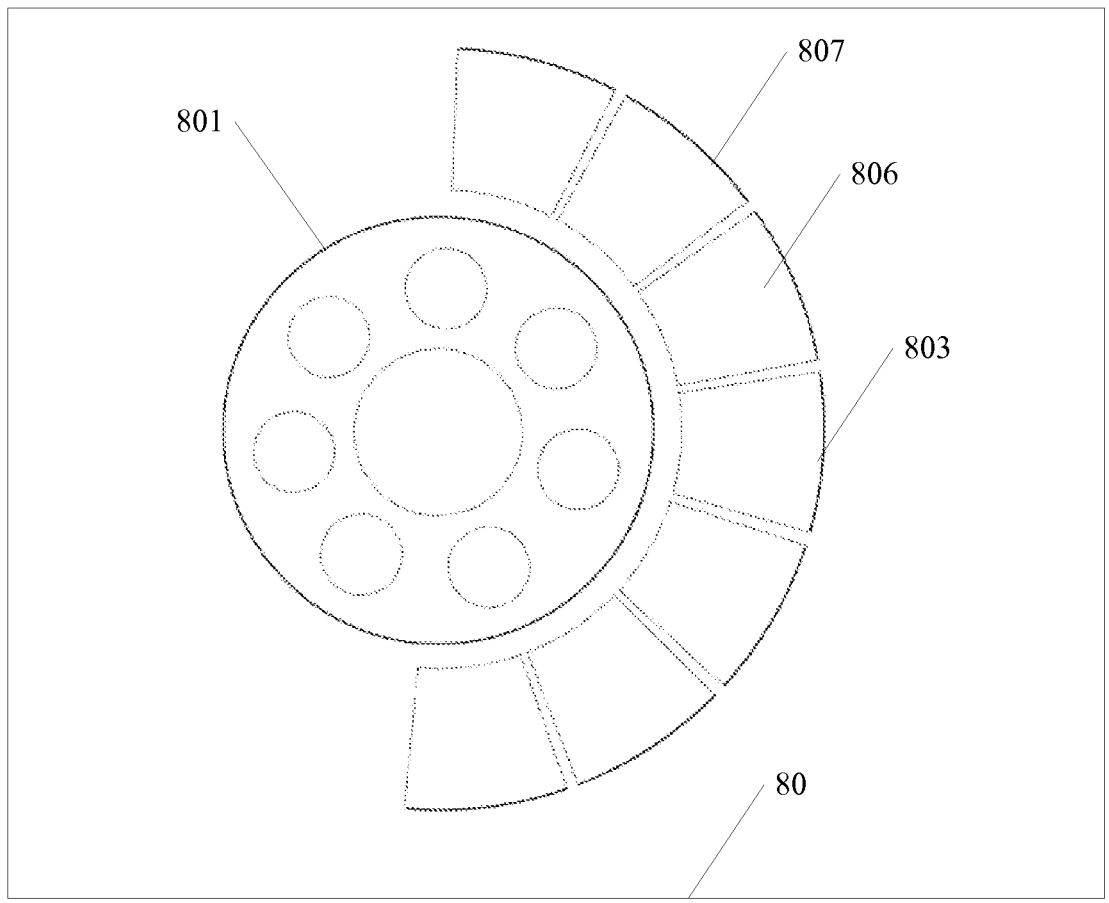
FIG. 9 is a schematic diagram of shapes of a curve and operating regions according to an embodiment of the disclosure.

Then, step 104 is performed, that is, the second operating region is displayed on the display unit 20. Referring to FIG. 2b, 9 second operation objects 204 are arranged at the second operating region 203, the 9 second operation objects 204 are sub-folders in a first operation objects 202, such as a picture folder. It may be seen from FIG. 2b that, the second operating region 203 is sector-shaped, and a broken line with an arrow represents the display direction of the first operation object 202, with a centre of the second operating region 203 being located at the broken line and the second operating region 203 being symmetrical relative to the broken line; a display direction of a q-th second operation object of the second operation objects 204 is identical to that of the first operation object 202. In the embodiment, the q-th second operation object is a second operation object 205, i.e. a folder called glacier, a centre of the second operation object 205 is also a centre of the second operating region 203, and the centre of the first operation object 202 is aligned with that of the second operation object 205.

Figure 2C:
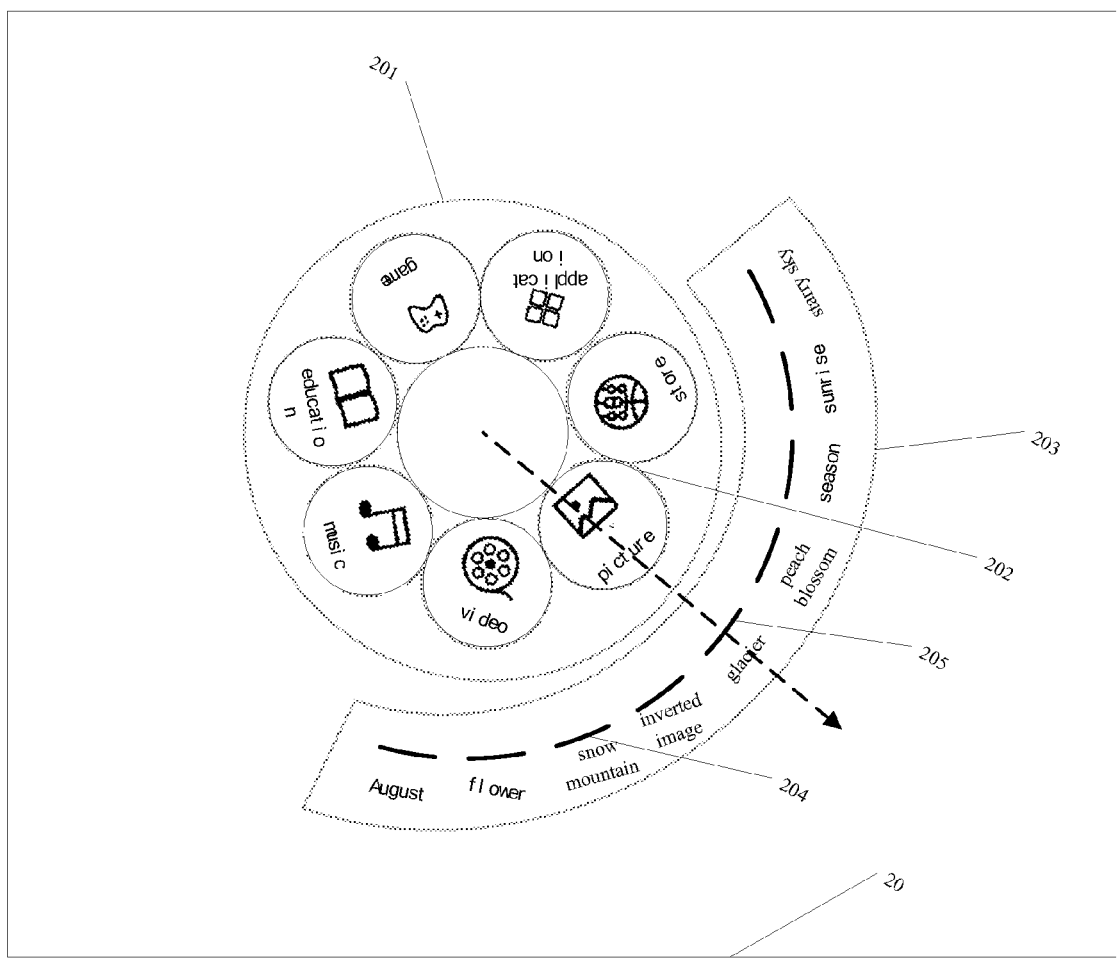

Next, referring to FIG. 2c again, when the first operating region 201 is moved from a first position on the display unit 20, for example the position as illustrated in FIG. 2b, to a second position as illustrated in FIG. 2c, for example being rotated from the first position to the second position, the first operating region 201 is rotated clockwise by 30 degrees, and moved from the left side to the right side in FIG. 2b by a certain distance. In this embodiment, since the display position and the display direction of the first operation object 202 are changed, apparently the display direction is also rotated clockwise by 30 degrees and coordinate values are changed, then the display position and the display direction of the second operating region 203 on the display unit 20 may also be changed due to the change in the display position and the display direction of the first operation object 202. It may be seen from FIG. 2c that, the second operating region 203 is also rotated clockwise by 30 degrees, and the display direction of the second operation object 205 is still consistent with that of the first operation object 202.

Further, in order to solve a technical problem that in use, the distance that the finger of the user moves is far due to the far distance between the second operating region and the i-the first operation object, thus leading to inconvenience and insufficient logicality, in specific implementation, a step 104 may also be implemented through the following way: the second operating region 203 is arranged at the periphery of the first operating region 201, and extends from its centre towards its opposite ends. Since the centre of the i-th first operation object and the centre of the second operating region 203 lie on the same straight line, thus the centre of the first operating region 201 is aligned with that of the second operating region 203. Therefore, when a user clicks on the i-th first operation object, the second operating region 203 may popping at the periphery of the i-th first operation object immediately to present itself to the user clearly and explicitly. In this way, the user can conveniently operate a second operation object on the second operating region 203 without (the user himself or the operation body) moving a long distance.

Figure 2D:
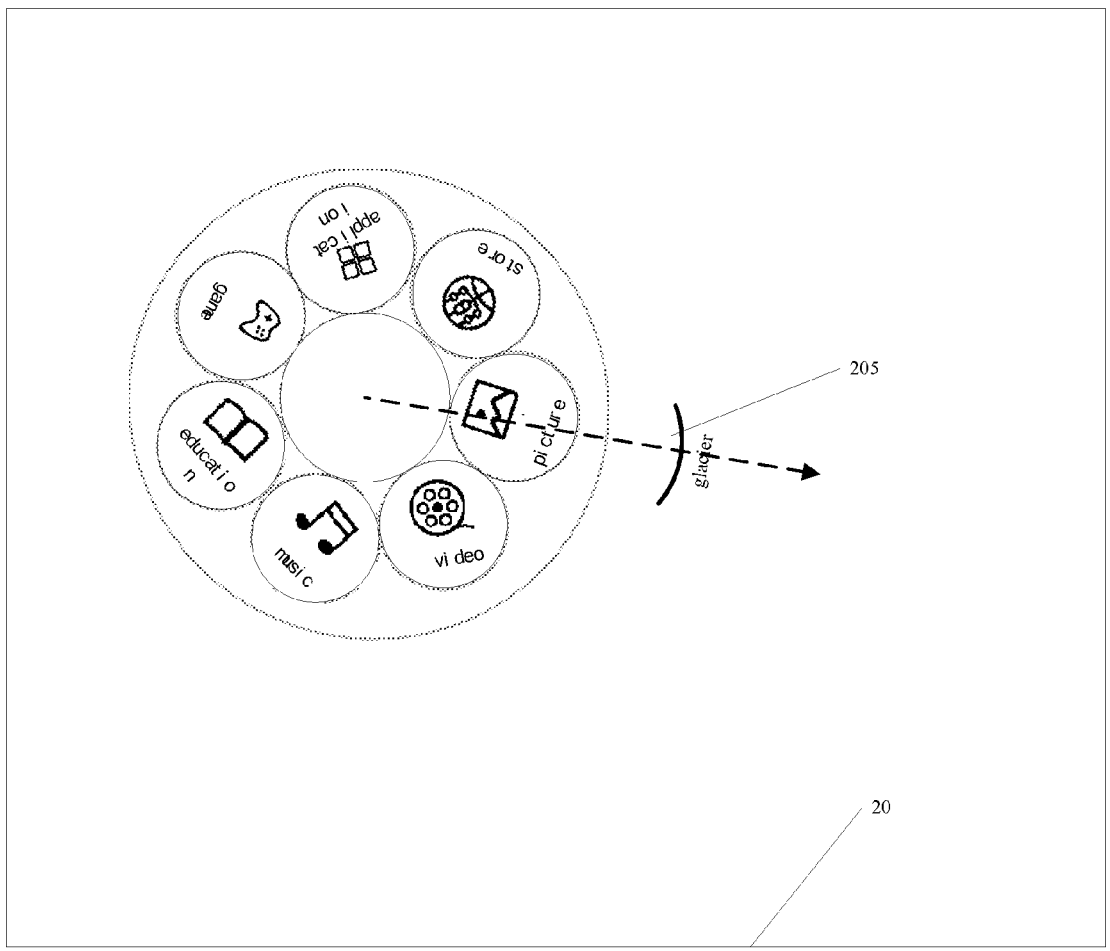
Figure 2E:
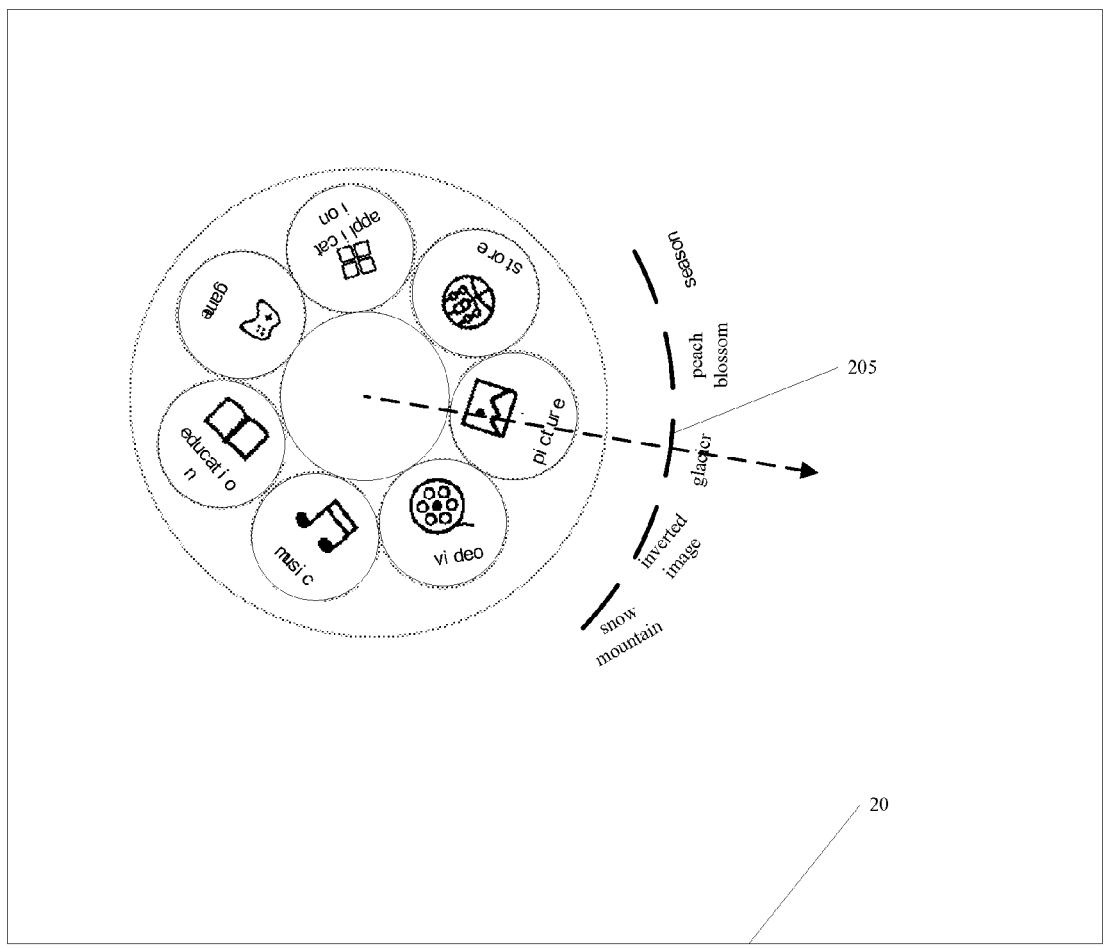
Figure 5:
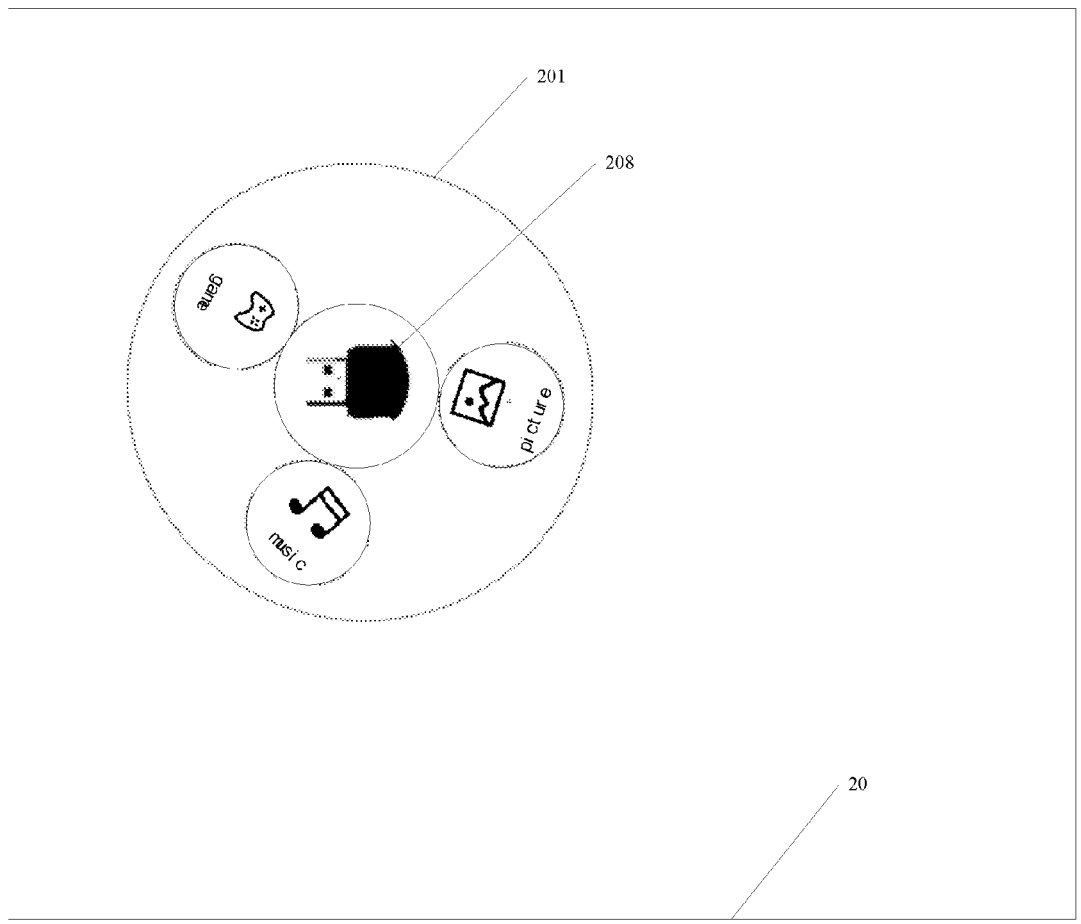
FIG. 5 is a schematic diagram showing the control for an electronic device according to yet another embodiment of the disclosure.

Referring to FIG. 2d, at first, a second operation object 205 is displayed on the centre of the second operating region 203; then other second operation objects are extendedly displayed at the both sides of the second operation object 205; as illustrated in FIG. 2e, 5 second operation objects have been extendedly displayed, then as illustrated in FIG. 2b, the complete second operating region 203 has been displayed.

In a further embodiment, when the display unit 20 supports multi-touch, the method of this embodiment may support multi-user usage, i.e. multiple users can operate the first operating region 201 at the same or different time, for example, after the first operating region 201 is displayed on the display unit 20, another user or the same user in the above embodiment clicks on other first operation object, then the electronic device will detect a second operation, and when the electronic device has detected the second operation, the electronic device select the j-th first operation object from M first operation objects in response to the second operation, where, the j-th first operation object is adjacent to the i-th first operation object. In the embodiment, for example, the j-th first operation object is the video if the user clicks on a video, which is adjacent to the first operation object 202.

Next, a step similar to the step 103 is performed, that is, a fourth operating region is determined based on the display position and the display direction of a j-th first operation object on the display unit 20, the determination is performed in the similar way as that described in the step 103, therefore the specific details will not be describe herein.

Next, the fourth operating region is displayed. Similarly, there are S second operation objects arranged at the fourth operating region, and the display direction of a k-th second operation object of the S second operation objects is identical to that of the j-th first operation object, and the fourth operating region is not completely overlapped with the second operating region 203.

Figure 3:
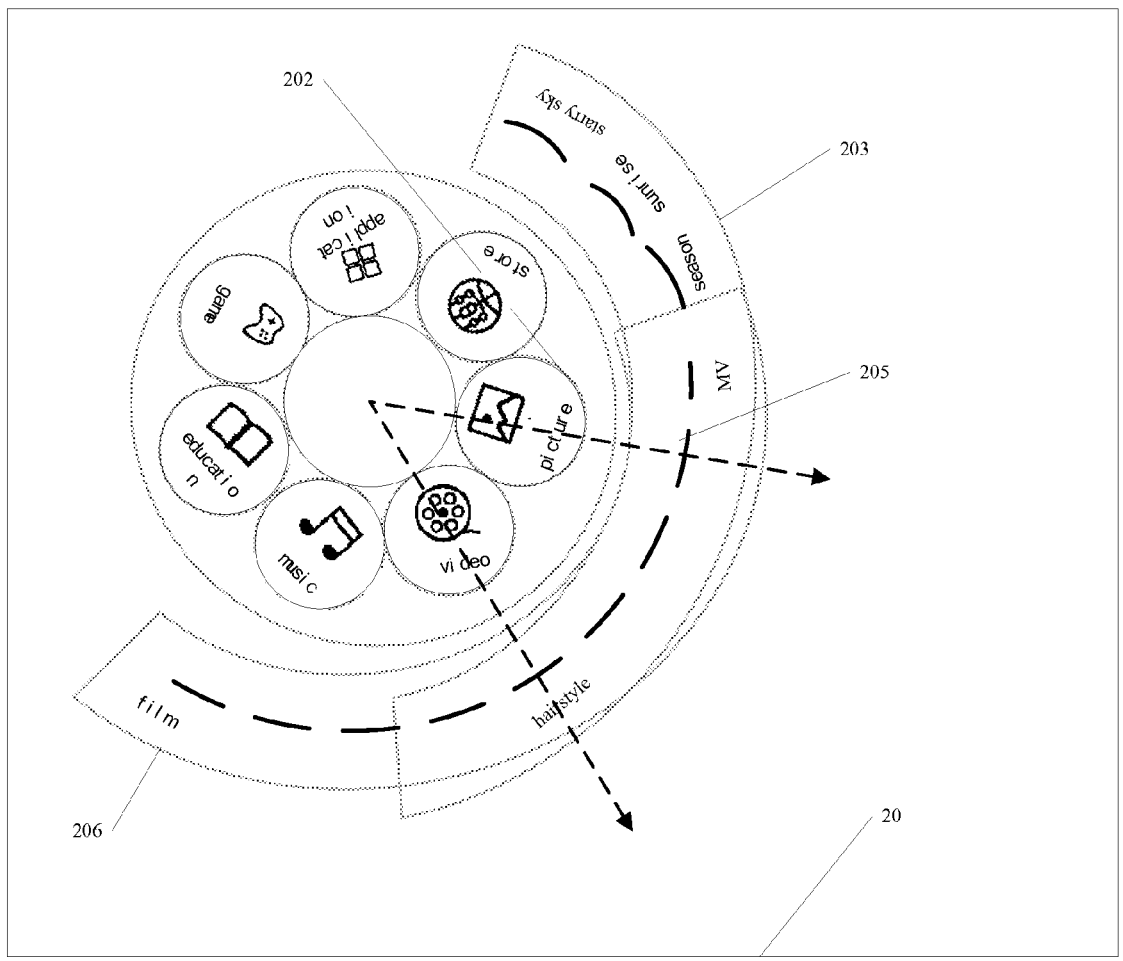
FIG. 3 is a schematic diagram showing the control for an electronic device according to another embodiment of the disclosure.

Assuming that the fourth operating region is displayed in the case of FIG. 2b, as shown in FIG. 3, there are 9 second operation objects on a fourth operating region 206, such as movie, hairstyle, MV, and others not shown; and the fourth operating region 206 covers a most part of the second operating region 203, but not completely overlapped with the second operating region 203. A part of area on the second operating region 203 is operable, for example, the second operation objects such as seasons, sunrise, and starry sky may be operated.

Further, the second operation object "hairstyle" is the k-th second operation object in this embodiment, and the display direction of the second operation object "hairstyle" is identical to that of the first operation object "video". Referring to an arrow of a broken line passing through "video" and "hairstyle", the arrow indicates the display direction, and the fourth operating region 206 is symmetrical relative to the broken line axis.

Of course, if the user selects "store", the fourth operating region corresponding to the "store" is also not completely overlapped with the second operating region 203, however, compared with the fourth operating region 206, the overlapped position is different, which is because the display position and the display direction of the "store" are different from that of the "video", and thus the position and the direction of the fourth operating region corresponding to the "store" are different from that of the fourth operating region 206 corresponding to the "video".

Figure 4:
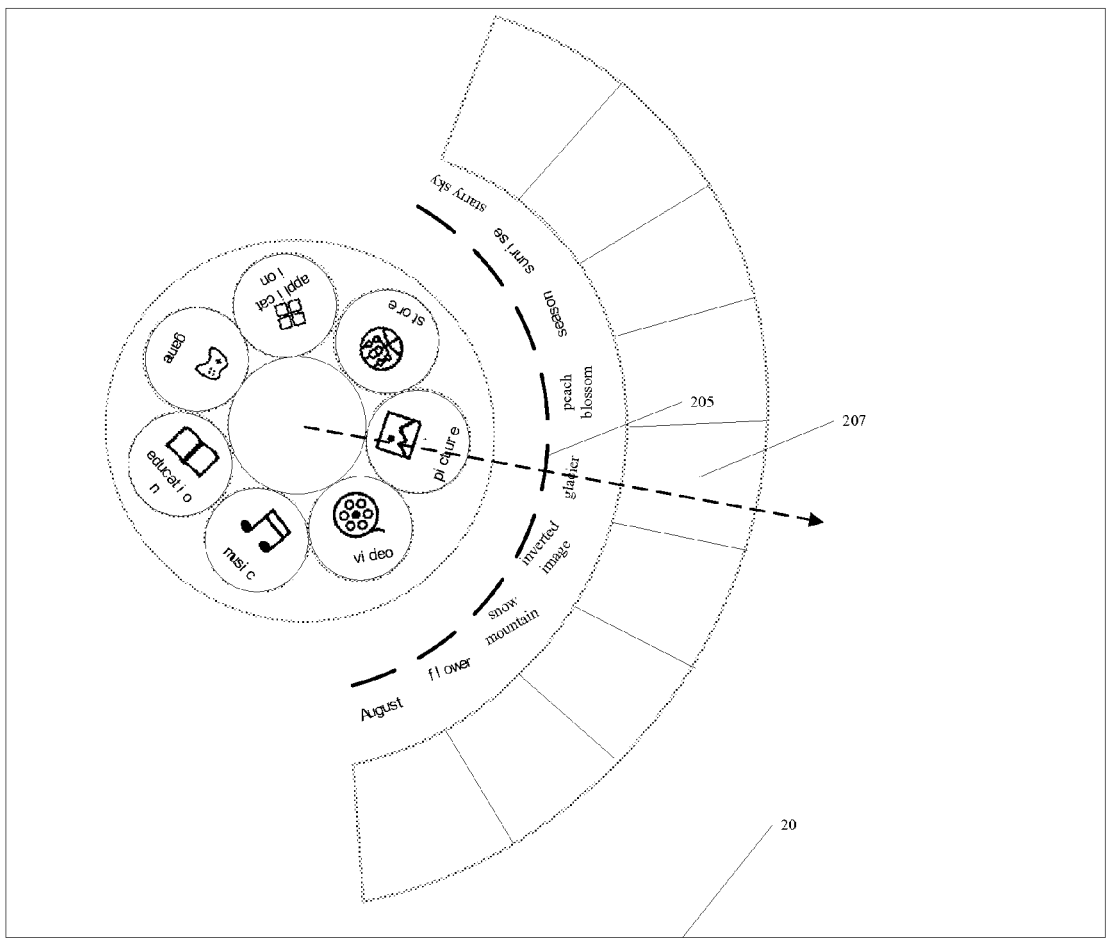
FIG. 4 is a schematic diagram of a display preview area according to an embodiment of the disclosure.

In a further embodiment, as illustrated in FIG. 4, after the step 104, that is, after the second operating region 203 is displayed, N preview areas 207 respectively corresponding to N second operation objects may also be determined based on a display position and a display direction of each of the N second operation objects. In the embodiment, the preview areas 207 may correspond to 9 second operation objects, that is, there are 9 separate preview areas, and pictures in "glacier" may be previewed in the preview areas 207; in another embodiment, the preview areas 207 is the whole sector area, and when a selection hasn't been performed in the second operation objects, what are previewed in the preview areas 207 are pictures corresponding to all the second operation objects, for example, the first three items in each of the second operation objects are previewed and displayed.

Further, a preview area corresponding to a p-th second operation object is activated to become a selectable area if a user selects the p-th second operation object of the second operation objects, where p is any integer between 1 and N. Specifically, for example, if the user selects the second operation object 205, the preview area 207 corresponding to the second operation object 205 becomes a selectable area, where, when each of the above-mentioned second operation objects corresponds to a separate preview area, the preview area 207 of the second operation object 205 may be operated by the user, and the user may browse pictures by turning pages left and right, and preview areas corresponding to other second operation objects give no response, therefore there will not be any change; when the preview area 207 is in the second case as described above, that is, the whole sector area is a common preview area, then when the user selects the second operation object 205, all the pictures in the glacier will be displayed in the preview area 207, and preview pictures of the other second operation object will not be displayed in the preview area 207. A preview picture corresponding a second operation object will be displayed on the preview area 207 Only if the user clicks on the second operation object, for example, if the user also clicks on "snow mountain" at this time, pictures in the sector-shaped preview area are replaced by pictures in a snow mountain folder, and the user may click to view or turn pages to browse.

Preferably, only when the second operation object is a bottom menu item or folder, the preview area is used, and for operation objects in other level menus or folders, the method described in the embodiment of FIG. 1 is applied.

In the previous descriptions for the implementation process of the step 102, i.e. by detecting to obtain a first operation, a first operating region 201 corresponding to the first operation is displayed in response to the operation, the displaying of the first operating region 201 on the display unit 20 by triggering is simply described, so next, one case thereof will be described in detail.

Specifically, in order to keep consistency of product design and consistency of interaction mode, when it is detected that a second electronic device is connected to the electronic device, a first operating region 201 is displayed, and x first operation objects of M first operation objects are operation objects on the second electronic device, where, x is any integer between 0 and M. Specifically, the second electronic device is for example a U disk or a mobile hard disk, or other electronic device such as a mobile phone. In the use case, specifically, there are two implementation ways as follows.

A first implementation way: when it is detected that the second electronic device is connected to the electronic device, a new first operating region 201 is set, and the first operating region 201 and the first operating region 201 originally located on the electronic device are two separate operating region, i.e. the user can operate on the two first operating regions 201 respectively. Further, an identifier may be displayed in the new-set first operating region, thus the user may know according to the identifier that the first operating region 201 corresponds to the second electronic device.

Referring to FIG. 5, it is assumed that a mobile hard disk is connected to the electronic device, the electronic device will acquire files on the mobile hard disk, then the files are categorized according to the different types of files, for example, which are divided into three categories including games, pictures, and music. Then the three categories are taken as the first operation object on the first operating region 201, and the first operating region 201 is displayed on the display unit 20, then a user may browse content corresponding to a category by clicking a first operation object.

Further, an identifier 208 of the mobile hard disk is also displayed on the first operating region 201. Of course, in other embodiments, a name of the second electronic device may also be displayed, or both the name and the identifier of the second electronic device may be displayed.

In the first case, all the operation objects on the first operating region 201 are all operation objects on the second electronic device, and if the number of the operation objects on the second electronic device is x, x is equal to M in the various embodiments above-mentioned at this time.

A second implementation way: the display unit 20 has displayed a first operating region, and when a second electronic device is connected to the electronic device, all the operation objects on the second electronic device are integrated into the first operating region 201 to form a new first operating region 201. In one embodiment, the electronic device determines files on the second electronic device, and determines the type of the files, and determines whether there is a first operation object on an original first operating region 201 corresponding to the type, the files are added below the corresponding operation object if there is. For example, when the electronic device detects that the file is a picture, the electronic device determines whether there is a first operation object on the original first operating region 201 corresponding to a category of picture. In this embodiment, since there is an operation object for a category of picture on the first operating region 201, the determination result is that there is a first operation object on the original first operating region 201 corresponding to the category of picture, the picture is then added below the category of picture in the first operation object.

In this embodiment, x is zero.

In another embodiment, firstly the type of files on the second electronic device is determined, and then the files are classified according to the types, these types are arranged on the original first operating region 201 to form a new first operating region 201.

Further, in order to distinguish which operation objects come from the electronic device and which operation objects come from the second electronic device in M first operation objects, the first operation objects from the second electronic device are marked to make the user clearly know that these first operation objects come from the second electronic device.

In this embodiment, x is less than M.

For the case that two or more second electronic devices are connected to the electronic device simultaneously, the two processing above can be applied, and the method is similar, which will not be described in detail herein.

In the above embodiments, the size of the second operating region may be changeable as a change in the number of the second operation objects, that is, the size of the second operating region is corresponding to the number of the N second operation objects, for example, as shown in FIG. 2e, when the number of the second operation objects is 5, the size of the second operating region is as large as that shown in FIG. 2e; when the number of the second operation objects is 9, the size of the second operating region is as large as that shown in FIG. 2b.

In another embodiment, the size of the second operating region is fixed, for example, the number of the second operation objects displaying at a time is G, where the G is an integer greater than or equal to 1. All the second operation objects can be displayed if N is less than G, and G second operation objects can be displayed on the second operating region at first if N is greater than G (the G second operation objects displayed on the second operating region can be selected according to the size, the priority or other principle); then, that whether there is a fifth operation is detected, and the second operation objects displayed on the second operating region is adjusted in response to the fifth operation if the fifth operation is detected. At least one of the second operation objects after the adjusting is different from the second operation objects displayed on the second operating region before the adjusting.

Also as shown in FIG. 2b, assuming that there are 9 second operation objects shown in FIG. 2b, since only 5 second operation objects can be displayed on the second operation at a time, for example, the 5 second operation objects shown in FIG. 2e, the user can slide the second operating region 203 from lower right to upper when the user intend to view other second operation objects, then the "seasons" at the top of the second operating region 203 is hidden, and the "flower" is displayed on the second operating region 203, the other operation objects move up subsequently.

In another embodiment, the user may click on a blank area of the second operating region 203 by using an operation body to make the second operating region 203 perform page turning. That is, all the five operation objects in FIG. 2e will be hidden and 4 remaining operation objects will be displayed on the second operating region 203, the user can switch a page of the second operating region 203 by a click.

Of course, in practice, the fifth operation may be other type of operation, and the way to adjust may also be other way, as long as that all second operation objects can be displayed on the second operating region, which is not limited in the disclosure.

In the above embodiments, at least one of a name or an icon of each operation object may be displayed no matter the first operating region or the second operating region is displayed.

In the above embodiments, the illustration is made by taking a case that the first operating region is a circular area and the second operating region is a sector area as an example, but in practice, other shapes can be used, for example the first operating region may be in a shape of a rectangle, and the second operating region may correspondingly be in a shape of an oblong; and the first operating region may be in a shape of an oval, the second operating region may also be correspondingly in a shape of an arc of the oval.

In the above embodiments, the illustration is made by taking a file navigation as an example, however the method in this embodiment can also be applied to other navigation system, for example, a menu navigation, then the M first operation objects are M first-level menu items, and the N second operation objects are N second-level menu items, in which, the N second lever menu items are sub-menus of an i-th first operation object.

Figure 6:
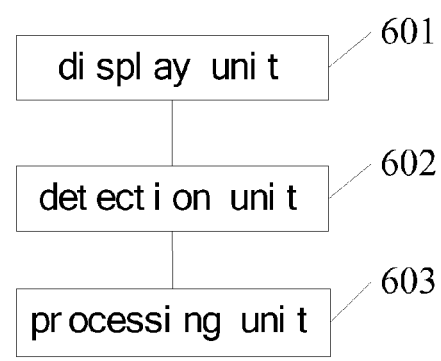
FIG. 6 is a functional block diagram of an electronic device according to an embodiment of the disclosure.

Based on the same inventive concept, the embodiments of the disclosure also provide an electronic device, and the electronic device may be for example a panel computer, a smart phone or a big-size tablet computer. As shown in FIG. 6, an electronic device provided in an embodiment of the disclosure includes: a display unit 601, configured to display a first operating region, with M first operation objects being arranged at the first operating region, where M is an integer greater than or equal to 1; a detection unit 602, configured to detect whether there is a first operation; and a processing unit 603, configured to select an i-th first operation object from the M first operation objects in response to the first operation if the first operation is detected, where i is any integer between 1 and M; determine a second operating region based on a display position and a display direction of the i-th first operation object on the display unit 601; control to display the second operating region on the display unit 601, where N second operation objects are arranged at the second operating region, and the display direction of a q-th second operation object of the N second operation objects is identical to that of the i-th first operation object, where N is an integer greater than or equal to 1, and q is an integer greater than or equal to 1 and less than or equal to N, where the display position of the i-th first operation object is a first display position and the display direction of the i-th first operation object is a first display direction if the first operating region is located at a first position on the display unit 601; the display position of the i-th first operation object is a second display position and the display direction of the i-th first operation object is a second display direction if the first operating region is located at the second position on the display unit 601, and the first display direction is different from the second display direction.

The display unit 601 is a touch display unit, and particularly is a display unit supporting multi-touch.

The detection unit 602 is a touch unit such as a capacitive touch unit, an electromagnetic touch unit, therefore, an operation by a user using an operation body such as a finger or a touch pen can be detected.

The processing unit 603 is a processing chip, which is arranged at a circuit board and connected to the detection unit 602.

In one embodiment, in a case that the display unit 601 supports multi-touch, the detection unit 602 is further configured to detect whether there is a second operation; and the processing unit 603 is also configured to: select a j-th first operation object from M first operation objects in response to the second operation, the j-th first operation object being adjacent to the i-th first operation object, and j being any integer between 1 and M which is different from i; determine a fourth operating region based on a display position and a display direction of the j-th first operation object on the display unit 601; and control to display the fourth operating region on the display unit 601, with S second operation objects being arranged on the fourth operating region, and the display direction of a k-th second operation object of the S second operation objects being identical to that of the j-th first operation object. The fourth operating region is not completely overlapped with the second operating region, where S is an integer greater than or equal to 1, and k is an integer greater than or equal to 1 and less than or equal to S. The display position of the j-th first operation object is a third display position and the display direction of the j-th first operation object is a third display direction if the first operating region is located at the first position, the display position of the j-th first operation object is a fourth display position, and the display direction of the j-th first operation object is a fourth display direction if the first operating region is located at the second position, and the third display direction is different from the fourth display direction.

In another embodiment, the processing unit 603 is further configured to determine N preview areas respectively corresponding to the N second operation objects based on the display position and the display direction of each of the N second operation objects; and display the N preview areas, where the N preview areas each displays thereon at least one preview file corresponding to a corresponding one of the N second operation objects.

Further, the detection unit 602 is further configured to detect whether there is a third operation; and the processing unit 603 is further configured to select a p-th second operation object from the N second operation objects in response to the third operation if the third operation is detected, p being any integer between 1 and N; and control to change a preview area in the N preview areas, which corresponds to the p-th second operation, into a selectable area.

In another embodiment, the detection unit 602 is further configured to detect whether there is a fourth operation; and the processing unit 603 is further configured to control to display a first operating region corresponding to the fourth operation being displayed on the display unit 601 in response to the fourth operation if the fourth operation is detected.

Further, the processing unit 603 is further configured to control to display the first operating region on the display unit 601 if the fourth operation is to connect a second electronic device to the electronic device, where x first operation objects in the M first operation objects are operation objects on the second electronic device, and x is any integer between 0 and M.

Further, the processing unit 603 is further configured to control to display at least one of name and identifier of the second electronic device in the first operating region.

In the above embodiments, a centre of the first operating region, a centre of the i-th first operation object and a centre of the second operating region lie on a same straight line.

Specifically, the first operating region is a circular area, and the second operating region is a sector area.

Further, the processing unit 603 is further configured to control to display the second operating region in the periphery of the first operating region where the second operating region extends towards its opposites ends from its centre.

In practice, the M first operation objects may be M first-level menu items, the N second operation objects may be N second-level menu items, and the N second-level menu items may be sub-menus of the i-th first operation object.

In one embodiment, the processing unit 603 is further configured to control the size of the second operating region being corresponding to the number of the N second operation objects.

In another embodiment, the size of the second operating region is fixed, and the number of second operation objects that can be displayed on the second operation at a time is G, where G is an integer greater than or equal to 1, and in a case that N is greater than G, the detection unit 602 is further configured to detect whether there is a fifth operation; the processing unit 603 is further configured to adjust the second operation objects displayed in the second operating region in response to the fifth operation if the fifth operation is detected, where at least one of the second operation objects after the adjusting is different from the second operation objects displayed in the second operating region before the adjusting.

The electronic device in the embodiment and the method for controlling an electronic device in the preceding embodiments are based on the same inventive conception. According to the preceding detailed descriptions to the method for controlling an electronic device and various variations thereof, those skilled in the art can clearly know the implementing process of the electronic device in the embodiments, and for clarity, the specific details will not be described here.

In one embodiment of the disclosure, a first operating region is displayed on a display unit, and M first operation objects, such as previous menu items or folders, are arranged at the first operating region, and the electronic device gives a response to a first operation (for example when an user presses on the i-th menu item or clicks on the i-th folder) if a first operation is detected to select the i-th first operation object that is selected by the user, and determines a second operating region based on a display position and a display direction of the i-th operation object on the display unit, then displays the second operating region on the display unit, with N second operation objects, such as sub-menu items of the i-th menu item or files in the i-th folder or other related contents, being arranged at the second operating region, where the display direction of a q-th second operation object of the N second operation objects is identical to that of the i-th first operation object, and where the display position of the i-th first operation object is a first display position and the display direction of the i-th first operation object is a first display direction if the first operating region is located at a first position on the display unit; the display position of the i-th first operation object is a second display position and the display direction of the i-th first operation object is a second display direction if the first operating region is located at a second position on the display unit, and the first display direction is different from the second display direction, i.e. the first operating region can be moved or rotated on the display unit, the position and direction of the second operating region are determined according to that of the i-th first operation object in the first operating region and the display position and the display direction of the i-th first operation object changes as the change of the first operating region. Therefore, by the technical solution of this embodiment, the navigation components can be moved or rotated on the display unit freely, and the position and the direction of the second operating region (sub-menus, sub-files) can change as the change of the position and the direction of the first operating region (previous menus, previous folders), thereby the use requirements for multi-user and multi-direction can be satisfied.

Further, in one embodiment of the disclosure, when a second electronic device, such as a USB disk or a portable hard disk, is connected to the electronic device, files in the second electronic device can also be organized like the navigation icons and the navigation mode described in the above embodiment, which may be provided in one additionally created navigation system or may also be integrated into the original navigation system of the electronic device. In this way, consistency of product design can be kept, and the use requirements for multi-user and multi-direction can also be satisfied.

Further, in order to solve a technical problem that in use, the distance that the finger of the user moves is far due to the far distance between the second operating region and the i-the first operation object, thus leading to inconvenience and insufficient logicality, especially in the case of large-size tablet computers in which the user may need to move for a certain distance to perform an operation if the distance described above is too far, the technical solution in which the second operating region is arranged in the periphery of the first operating region and extends toward to its opposite ends from its centre and the centre of the first operating region, the centre of the i-th first operation object and the centre of the second operating region lie on a same straight line is adopted. Thus logicality between the second operating region and the i-th first operating region is fully reflected, and since the second operating region is close to the i-th first operation object, the user does not need to move for a long distance to operate the second operating region when the i-th first operation object is selected, and the convenience of use is improved.

A method for controlling an electronic device provided in an embodiment of the disclosure includes: a first operating region is displayed on a display unit, and M first operating objects such as an upper-level menu or folder are arranged at the first operating region. When it is detected that a first operation such as an user pressing a i-th menu or clicking a i-th folder has been detected, then an electronic device may select the i-th first operating object selected by the user in response to the first operation, determine a second operating region and N second operating objects based on the i-th first operating object, and then display the N second operating objects (for example, a lower-level menu of the i-th menu, a file of the i-th folder or other related contents) on the second operating region. When the N second operating objects are displayed on the second operating region, the N second operating objects respectively correspond to N first operating sub-regions each of which has one reference point, a connecting line of the N reference points is a curve, and the rules for determining the reference point on different first operating sub-regions are the same, where N is an integer equal to or greater than 1. Therefore, according to the solutions of the embodiment, the operating objects may be arranged in a curve. That is, at least one of the connecting lines between the reference points is a curve, or that is, the operating objects may have different shapes and sizes, and even if the shapes and sizes of all the operating objects are the same respectively, they may be arranged in a curve. Therefore, the displaying manners for the operating objects may be enriched and diversified, and further more, the experience of the user is improved.

A method for controlling an electronic device is provided according to an embodiment of the disclosure, which is applied to an electronic device such as traditional tablet computers, large-size tablet computers or other electronic devices supporting multi-user operation or multi-direction operation. The electronic device may include a display unit.

Figure 7:
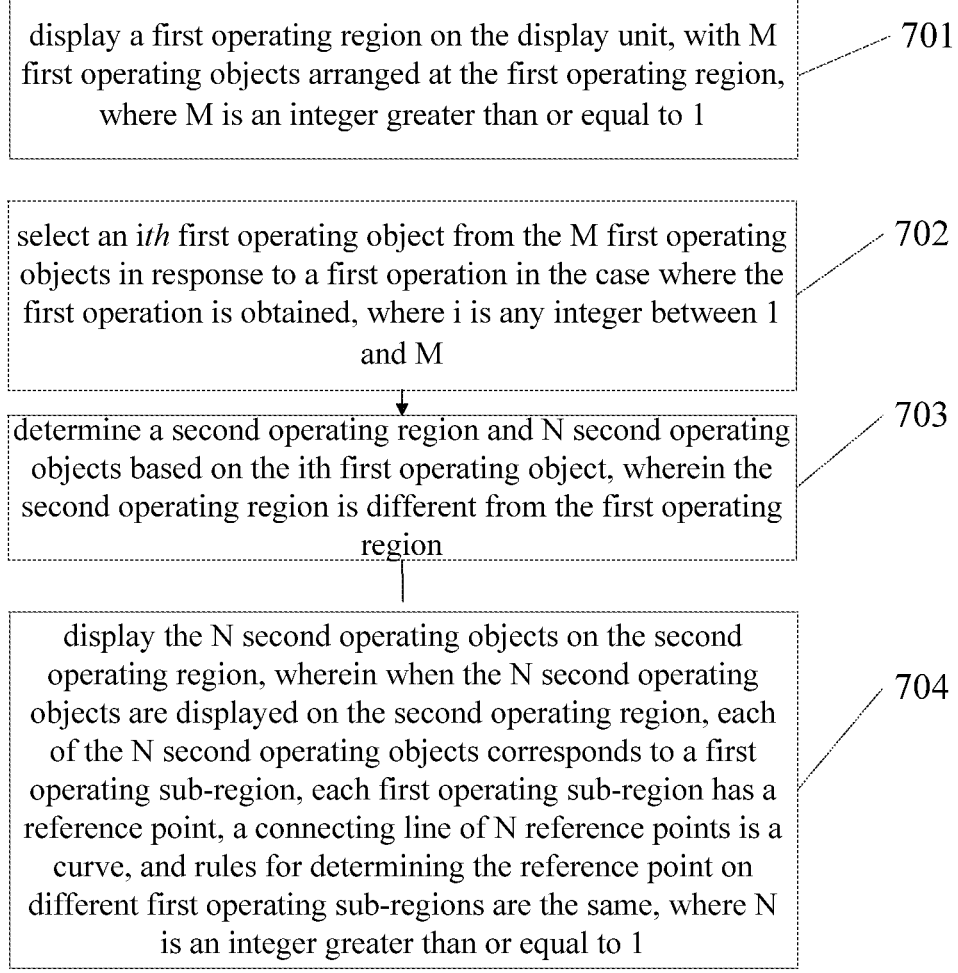
FIG. 7 is a flow chart of a method for controlling an electronic device according to an embodiment of the disclosure.

FIG. 7 is a flow chart of a displaying method according to the embodiment. The method may include:

step 701: displaying a first operating region on the display unit, where M first operating objects are arranged at the first operating region, where M is an integer greater than or equal to 1;

step 702: selecting an ith first operating object from the M first operating objects in response to a first operation if the first operation is detected, where i is any integer between 1 and M;

step 703: determining a second operating region and N second operating objects based on the ith first operating object, where the second operating region is different from the first operating region; and step 704: displaying the N second operating objects on the second operating region, where when the N second operating objects are displayed on the second operating region, each of the N second operating objects corresponds to a first operating sub-region, each first operating sub-region has a reference point, a connecting line of N reference points is a curve, and rules for determining the reference point on different first operating sub-regions are the same, where N is an integer greater than or equal to 1.

In step 701, the first operating region is displayed. The shape of the first operating region may be a circle, a rectangle or other shapes. The M first operating objects are arranged at the first operating region, and each of the first operating objects may be an upper-level menu (i.e., a parent menu or a main menu), or may be a folder or a file.

Furthermore, regarding step 701, the first operating region may be displayed on the display unit upon the startup of the electronic device, or may be displayed on the display unit by a triggering operation after the startup of the electronic device. For example, when the first operating region is concealed, the user may click by a finger on an edge region of the display unit and thus the first operating region is activated and displayed on the display unit; or an external electronic device may be connected to the electronic device and thus the first operating region is displayed. The disclosure is not limited thereto.

After step 701 is performed, the first operating region is displayed on the display unit, and the electronic device may perform step 702 to detect whether there is a first operation. For example, it is detected that whether at least one of the M first operating objects is clicked by an operating body or a cursor. the operating object (e.g., an i-th first operating object, i is an integer between 1 and M) clicked by the operating body may be selected from the M first operating objects in response to the first operation if the first operation is detected.

The user selecting the i-th first operating object indicates that the user may want to view or operate a lower-level menu or a lower-level file corresponding to the i-th first operating object. At this time, it is necessary to decide where the lower-upper menu or the lower-level file is to be displayed on the display unit, and which second operating objects correspond to the i-th first operating object need to be determined, therefore, step 703 is performed.

According to the embodiment, step 703 is to determine a second operating region based on the display position and the display direction of the i-th first operating object on the display unit. The second operating region bears N second operating objects such as the lower-level menu or the lower-level file described above.

The display position may be obtained through coordinates of the i-th first operating object on the display unit, and the display direction may be obtained through an angle between the straight line connecting the coordinates to the reference point and a reference edge, or an offset angle from the reference point. Of course, in practice, the display position and the display direction of the i-th first operating object on the display unit may be determined by other ways, and the disclosure is not limited thereto.

Then, the second operating region may be determined based on the display position and the display direction of the i-th first operating object on the display unit. For example, the position and the direction of the second operating region may be determined, and the size of the second operating region may be further determined.

Subsequently, step 704 may be performed, that is, displaying N second operating objects on the second operating region, for example, which may include: determining the N reference points; determining a trace corresponding to the curve; aligning the N reference points along the trace; and displaying the N second operating objects.

In practice, the determining the N reference points may be performed in a predetermined rule. For example, the central point of the N second operating objects may be selected as the reference point, or at least one of the points on an edge of the second operating objects may be selected as the reference point.

Subsequently, the trace is determined. Since the trace corresponds to the curve, the trace is a curve. The trace may be determined in a predetermined rule, for example, which may be an arc-shaped trace or a polyline-shaped trace. Preferably, the trace has a shape corresponding to that of the first operating region. For example, when the first operating region is in a circle shape, the trace may be determined as a circle-shaped trace. For another example, when the first operating region is in a rectangle shape, the trace may be determined as rectangle-shaped trace. In this way, the consistency for designing products may be guaranteed.

After the trace is determined, the N reference points may be aligned along the trace, that is, the N reference points may be arranged at the trace.

Then, the N second operating objects are displayed. At this time, the N second operating objects respectively correspond to N first operating sub-regions, each of which has one reference point. The connecting line of the N reference points may be a curve corresponding to the trace.

Of course, according to other embodiments, the trace may be firstly determined and then the reference points may be determined in step 104, and the disclosure is not limited thereto.

Furthermore, the rules for determining a reference point on each of the first operating sub-regions are the same. Similarly, the reference point may a central point of each of the first operating sub-regions; or may be a point on each of the first operating sub-regions which may be farthest or nearest to the center of the first operating region.

According to another embodiment, a q-th second operating object of the N second operating objects has the same display direction as that of the i-th first operating object, where N is an integer equal to or greater than 1, and $1 \leq q \geq N$.

If the second operating region is determined based on the display position and the display direction of the i-th first operating object on the display unit, when the first operating region is located on a first position on the display unit, the display position of the i-th first operating object is a first display position, and the display direction of the i-th first operating object is a first display direction; and when the first operating region is located on a second poison on the display unit, the display position of the i-th first operating object is a second display position, and the display direction of the i-th first operating object is a second direction, where the first display direction is different from the second display direction.

The qth second operating object of the N second operating objects has a display direction consistent with that of the i-th first operating object. For example, the q-th second operating object has an offset angle from a reference point which is the same as that of the i-th first operating object.

According to an embodiment, the position of the q-th second operating object is the center of the second operating region, and the other second operating objects are symmetrically distributed at the two sides of the q-th second operating object. Of course, according to other embodiments, the q-th second operating object may further located at the beginning or the end of the second operating region.

Figure 8A:
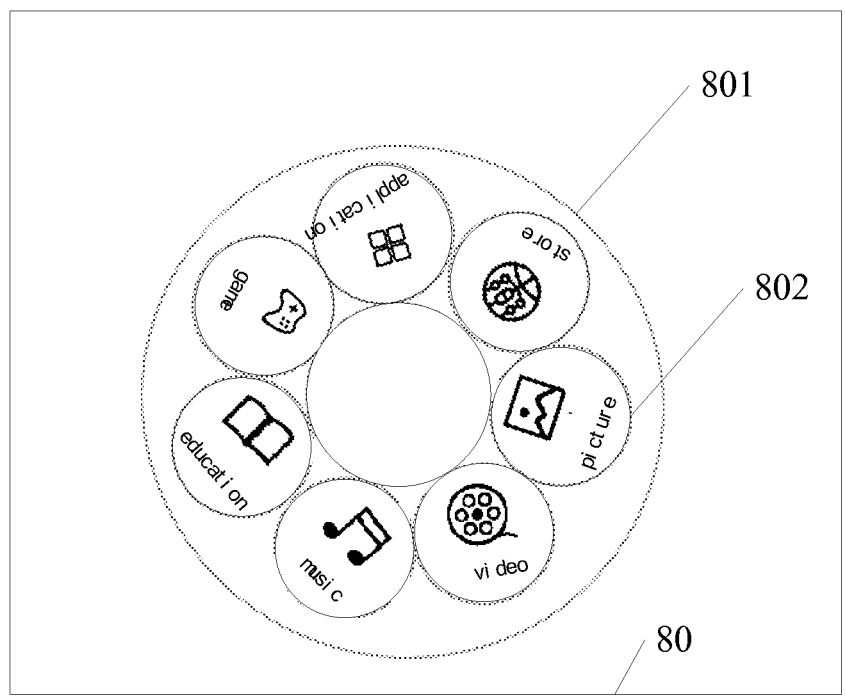
FIGS. 8a to 8c are diagram of displaying operating regions according to an embodiment of the disclosure.

As shown in FIG. 8a, the electronic device may include the display unit 80. In step 701, for example, the first operating region 801 is displayed on the display unit 80 after the startup of the electronic device, and 7 first operating objects are arranged at the first operating region 801. Although the embodiment is explained by an example of the first operating region being in the shape of a circle, the operating region may be in the shape of an ellipse, a rectangle shape or other shapes according to other embodiments. The first operating objects are illustrated by taking photos, APP stores, applications, games, education, music and videos as examples. These first operating objects may include folders, photos, music, navigating menus and applications and so on. The first operating objects corresponding to the applications may be treated as folders, and the folders may be treated as navigating menus.

When the user wants to browse photos, the user may use a finger, a touch pen or a mouse to select a first operating object (i.e., first operating object 802) corresponding to a photo, and then the electronic device may select the first operating object 802 by performing step 702. For example, the first operating object being selected may be indicated in a manner of highlighting or sinking, and then the user may know that the first operating object has been selected.

Subsequently, step 703 may be performed, that is, the second operating region and the N second operating objects may be determined based on the first operating objects 802.

For example, the second operating region may be determined based on the display position and the display direction of the first operating object 802 on the display unit 80. As for acquiring the display position of the first operating object 802, coordinates of the center of the first operating objects 802 may be directly acquired; and as for acquiring the display direction, the direction pointing from the center of the first operating objects 802 to the center (e.g., center of a circle) of the first operating region may be taken as the display direction of the first operating objects 802, therefore, the second operating region may be determined based on the display position and the display direction. According to an embodiment, the center of the second operating region may be determined based on the display position and the display direction. For example, the center may be located on a prolonged line of a line from the center of circle to the center of the first operating objects 802, and furthermore, the second operating region may be displayed close to the first operating region 801. As a result, the center of the second operating region may be determined by a preset width of the second operating region and therefore, the second operating region may be determined. That is, in the case of the width of the second operating region being determined, the second operating region may be determined based on the display position and display direction of the first operating object 202, no matter which position of the display unit the first operating region 201 will be moved to, whether the first operating region is rotated, or which direction the first operating objects 202 are directed to.

Then step 704 may be performed, that is, the N second operating objects are displayed on the second operating region. Specifically, referring to FIG. 8b, 9 second operating objects 804 are arranged at the second operating region 803, and the 9 second operating objects 804 are photos in the first operating object 802 such as a photo folder. It can be seen from FIG. 8b, the second operating region 803 is fan-shaped, where the dotted line with an arrow indicates the display direction of the first operating object 802, a center of the second operating region 803 is located in the dotted line and the second operating region 803 is axial symmetric with respect to the dotted line; and the display direction of a qth second operating object of the second operating objects 804 is consistent with that of the first operating object 802. In this embodiment, the qth second operating object is the second operating object 805, a center of the second operating object 805 is the center of the second operating region 803, and a center of the first operating object 802 is aligned with the center of the second operating object 805.

Figure 8B:
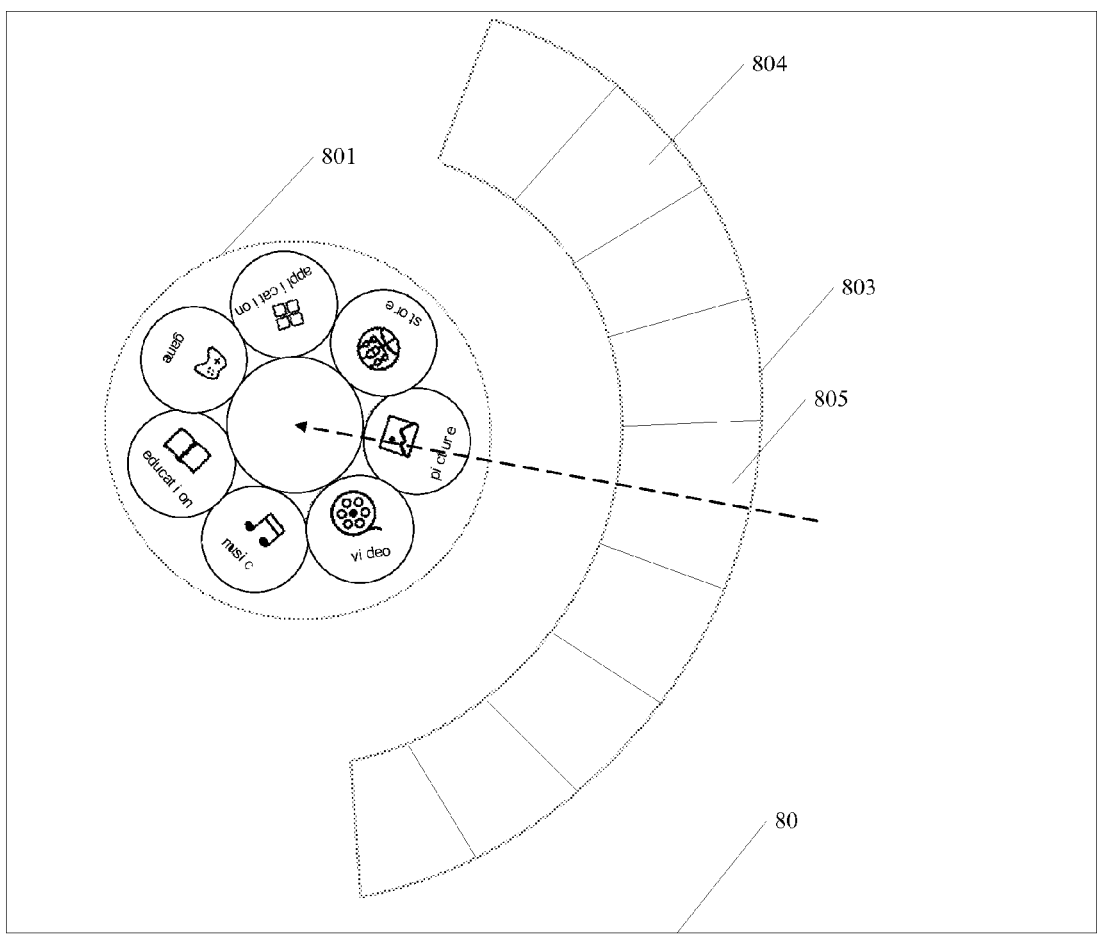
Figure 8C:
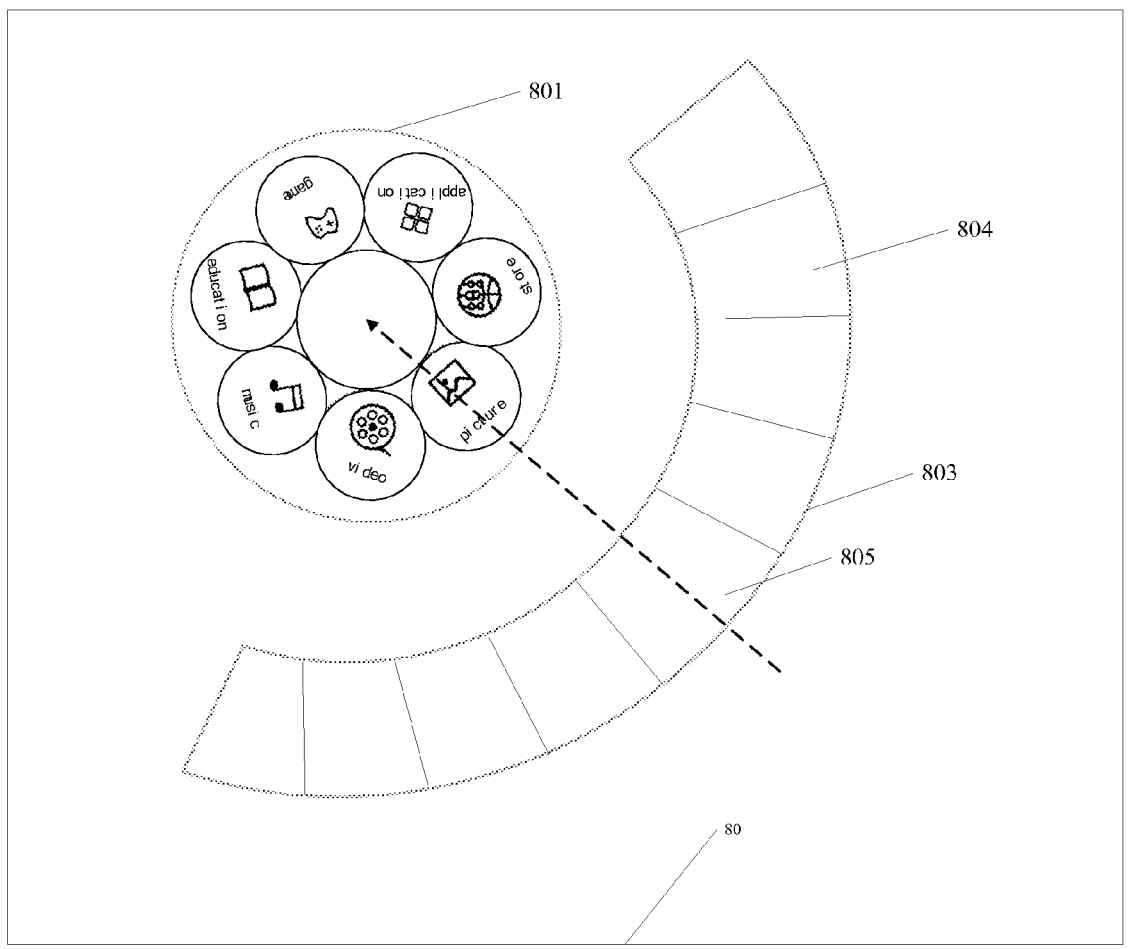

Next, referring to FIG. 8c, when the first operating region 801 is moved from the first position of the display unit 80 such as the position as shown in FIG. 8b to the second position in FIG. 8c, for example, rotated from the first position to the second position, the first operating region 801 is rotated clockwise by 30 degree and the position thereof is moved by a certain distance from the left to the right of FIG. 8b. In this embodiment, since the display position and display direction of the first operating object 802 are changed, where the display direction thereof is also rotated clockwise by 30 degree apparently and the coordinate values thereof are changed, the display position and display direction of the second operating region 803 on the display unit 80 will be changed due to the changes of the display position and display direction of the first operating object 802 It can be seen from FIG. 8c, the second operating region 803 is also rotated clockwise by 30 degree, and the display direction of the second operating object 805 still maintains consistent with the that of the first operating object 802.

Next referring to FIG. 9, when the N second operating objects are displayed on the second operating region 803, each of the N second operating objects corresponds to a first operating sub-region 806, each first operating sub-region 806 has a reference point, and a connecting line of N reference points is a curve. In FIG. 9, the curve 807 is an arc concentric with the first operating region 801, and the reference point is a point on each first operating sub-region 806 which is furthest to the center of the first operating region 801. In this embodiment, the overall shape of the N first operating sub-regions 806 are in the shape of fan-ring.

Figure 10:
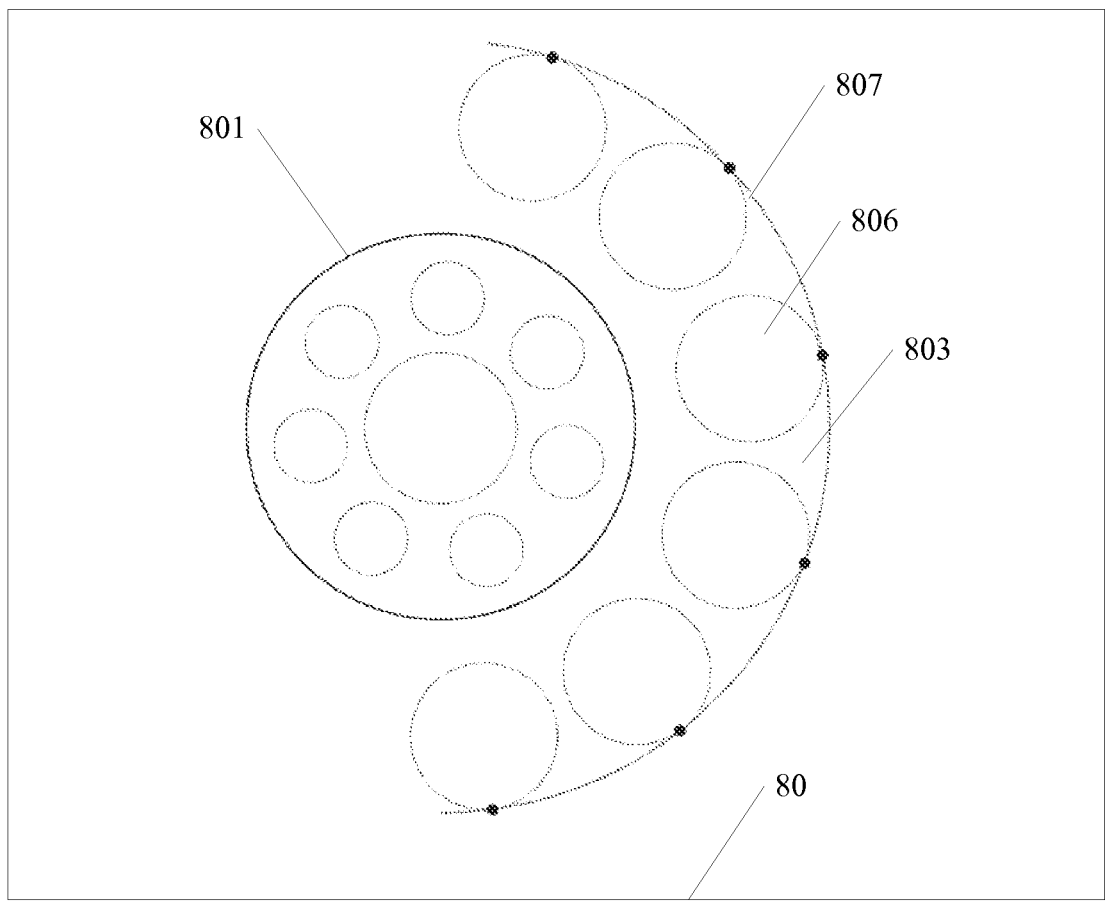
FIG. 10 is a schematic diagram of shapes of a curve and operating regions according to an embodiment of the disclosure.

Next, referring to FIG. 10, when the N second operating objects are displayed on the second operating region 803, each of the N second operating objects corresponds to a first operating sub-region 806. In this embodiment, each first operating sub-region 806 is a circular area with an equal radius, each first operating sub-region 806 has a reference point, and a connecting line of N reference points is a curve. In FIG. 10, the curve 807 is an arc concentric with the first operating region 801, and the reference point is a point on each first operating sub-region 806 which is furthest to the center of the first operating region 801. The arc is tangent with each first operating sub-region 806 internally.

Figure 11:
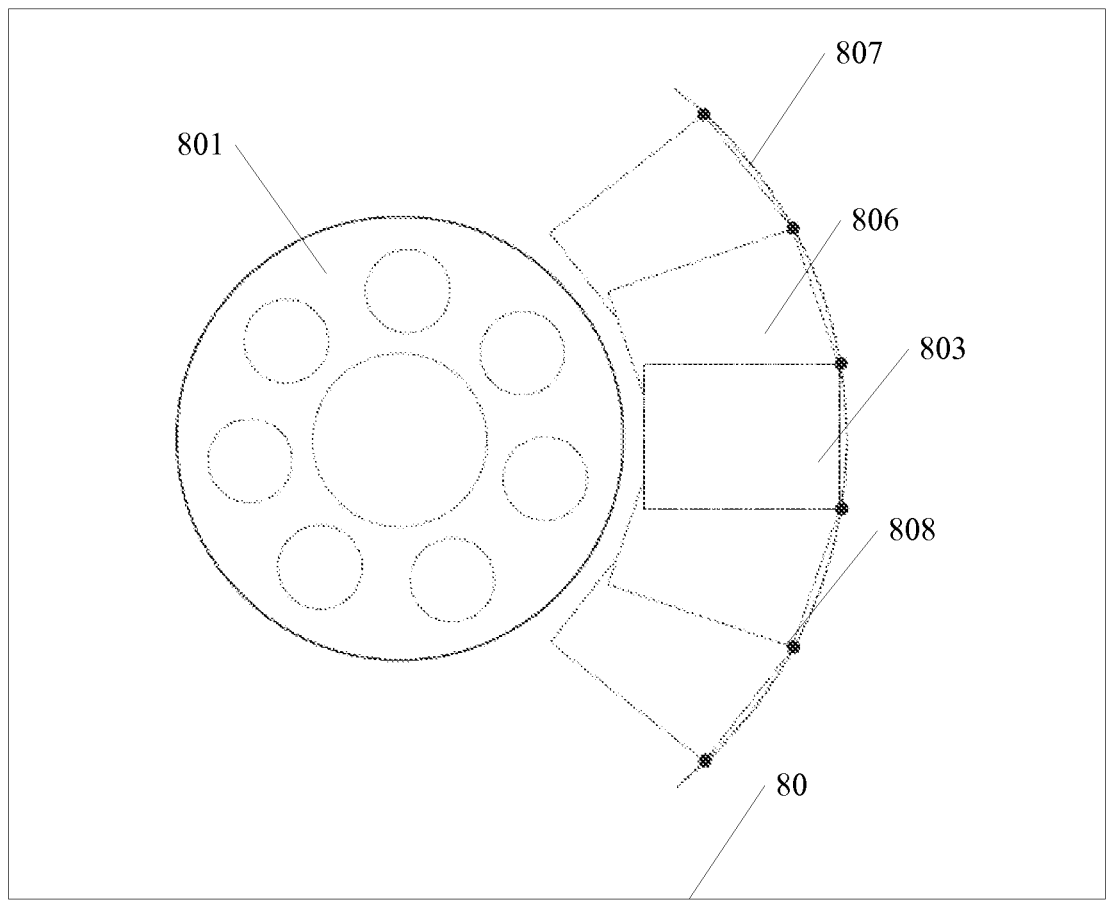
FIG. 11 is a schematic diagram of shapes of a curve and operating regions according to an embodiment of the disclosure.

Next, referring to FIG. 11, when the N second operating objects are displayed on the second operating region 803, each of the N second operating objects corresponds to a first operating sub-region 806. In this embodiment, each first operating sub-region 806 is a rectangular region, each first operating sub-region 806 has two reference points, that is, two top points 808 of the first operating sub-region 806, and there is one overlapped top point among the two top points 808 of two adjacent first operating sub-regions 806, and a connecting line of N reference points is a curve. In FIG. 11, the curve 807 is an arc concentric with the first operating region 801.

Further, in FIGS. 9, 10 and 11, the reference point may be a point on the first operating sub-region 806 which is nearest to the center of the first operating region 801, and may also be a center point of the first operating sub-region 806. Regardless of which one, the curve 807 is an arc concentric with the first operating region 801.

Further, in FIGS. 9 to 11, the reference points are connected by an arc, so the curve 807 is an arc. If the reference points are connected by a straight line, the curve 807 is polyline-shaped.

Figure 12:
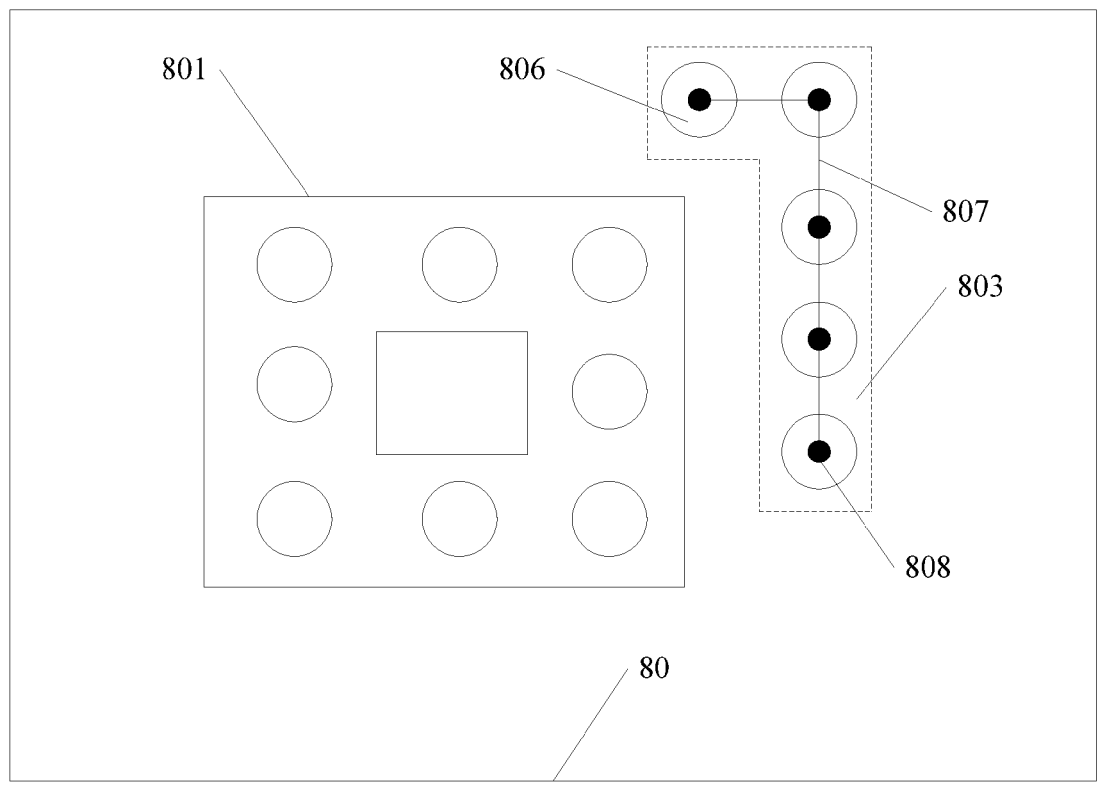
FIG. 12 is a schematic diagram of shapes of a curve and operating regions according to an embodiment of the disclosure.

Next, further referring to FIG. 12, in this embodiment, the first operating region 801 is a rectangular region, and accordingly the second operating region 803 is a polyline-shaped region. When the N second operating objects are displayed on the second operating region 803, each of the N second operating objects corresponds to a first operating sub-region 806. In this embodiment, each first operating sub-region 806 is a circular area with an equal radius, each first operating sub-region 806 has a reference point 808, and a connecting line of N reference points is a curve 807. In FIG. 12, the curve 807 is a polyline, and the reference point 808 is a center point of the first operating sub-region 806.

In further embodiments, a distance between the curve and external borders of the first operating region meet a predetermined condition. Specifically, for example, the predetermined condition ensures that the first operating sub-regions corresponding to each of the N second operating objects do not overlap with the first operating region 801 when the N second operating objects are displayed on the second operating region.

In another embodiment, specifically, for example, the predetermined condition is that a second operating sub-region may further be formed between the first operating region 801 and the first operating sub-region in addition to the first operating sub-regions corresponding to each of the N second operating objects when N second operating objects are displayed on the second operating region 803, where the second operating sub-region is configured to display L third operating objects. Specifically, the step of displaying L third operating objects may be performed during step 804, after step 803 and before step 804, or after step 804, where L is an integer greater than or equal to 1.

Figure 13:
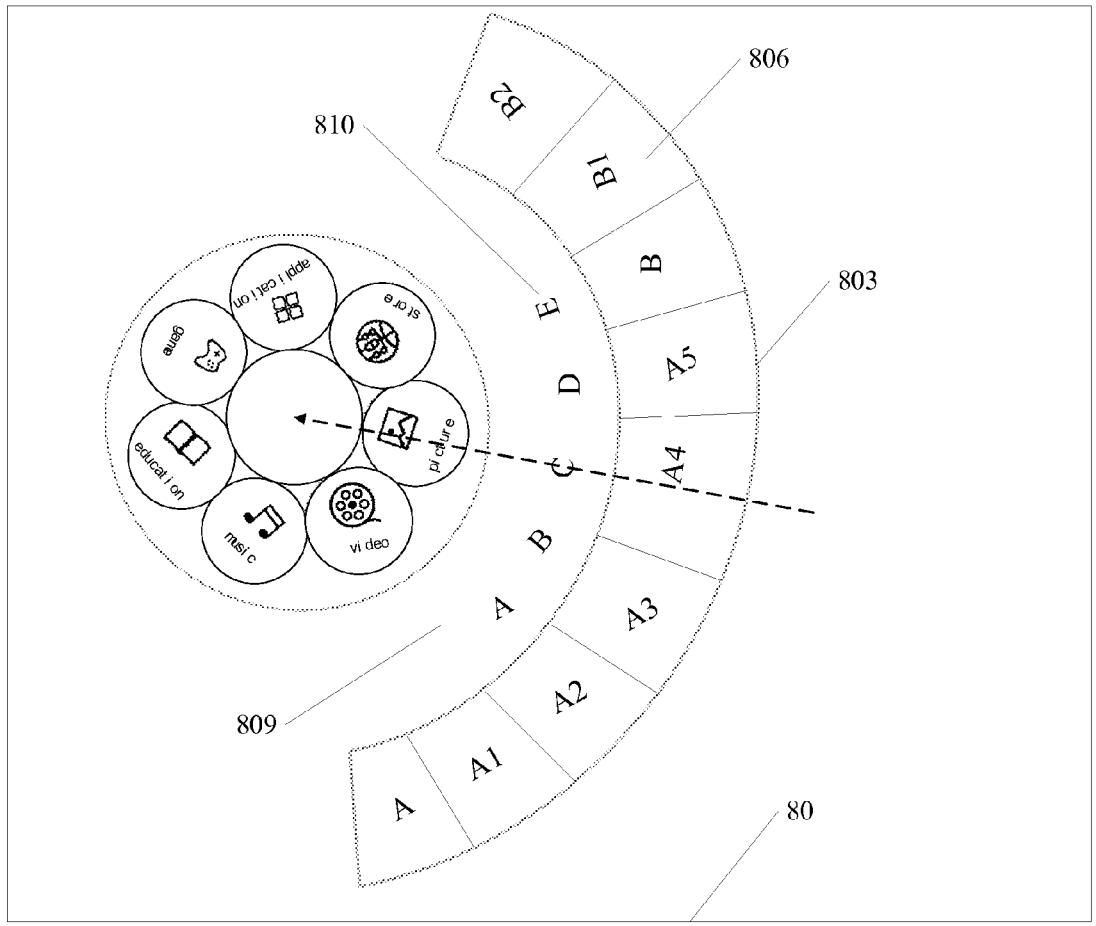
FIG. 13 is a schematic diagram of a second operating sub-region according to an embodiment of the disclosure.

Referring to FIG. 13, a second operating sub-region 809 is located between the first operating region 801 and the first operating sub-region 806. In this embodiment, it is assumed that 8 third operating objects are arranged on the second operating sub-region 809, respectively A to H, for example, a third operating object 810; and at most 5 third operating objects can be displayed on the second operating sub-region 809 at each time.

During initial display, the second operating objects displayed on the first operating sub-region 806 are displayed in a random display manner or in a sequential order, for example.

In a specific implementation, the second operating objects are photos in the first operating object 802 such as a photo folder. The third operating objects are subfolders of the first operating object 802 such as a photo folder, and are index entries of the second operating objects. In this embodiment, during the initial display, the second operating objects on the first operating sub-region 806 are arranged and displayed in the order of the third operating objects, and are arranged and displayed in the order of the second operating objects corresponding to the third operating objects. As shown in FIG. 13, the third operating object arranged at the first position is a third operating object A, and these arranged at the top five in the folder A are respectively the second operating objects A1 to A5. Further, in FIG. 13, since there are only second operating objects in the folder A, it is not sufficient to occupy all the display positions on the second operating region 803, thus the second operating objects B1 and B2 corresponding to the third operating object B then are displayed.

Furthermore, in FIG. 13, the third operating objects and the second operating objects are both arranged and displayed in anticlockwise. Certainly, in practice, they may also be arranged and displayed in clockwise Therefore, with the method according to this embodiment, when one first operating object is selected, two operating regions related to the first operating object will be popped up, with each operating region has an corresponding operating object displayed thereon, so that it is unnecessary for the user to click twice, the electronic device will pop up two operating regions in response to an operation as long as it receives this operation, and thus the efficiency of human-computer interaction is improved.

Further, in an embodiment of the disclosure, the L third operating objects on the second operating sub-region are index entries of the N second operating objects. With the method according to this embodiment, when one first operating object is clicked, the second operating object and the index entry of the second operating object will be popped up at the same time, that is, two levels of menus will be presented at the same time, so that the organizational structure between the operating objects can be embodied entirely, the management of the electronic device on the operating object becomes convenient, and the utilization of the user is convenient. For example, the user can search in accordance with the index entry without spending much time to search among the large number of second operating objects if the number of the second operating objects is huge.

In further embodiments, when the j-th third operating object is selected, the display of the second operating object is adjusted, and the second operating object corresponding to the j-th third operating object is displayed on the second operating region. That is, the display status of the second operating object may be changed by clicking the third operating object. For example, in FIG. 13, when a third operating object C is clicked and selected, the second operating object corresponding to the third operating object C is changed from a hidden status in FIG. 13 to a display status, and displayed on the first operating sub-region. With the method according to this embodiment, the display status of the second operating object may be adjusted quickly by selecting the third operating object, so that the second operating object corresponding to the selected third operating object can be displayed quickly on the second operating region.

In another embodiment, when the third operating object displayed on the second operating sub-region is adjusted by a triggering operation such as a sliding operation, the second operating object displayed on the second operating region does not change, that is, changing the third operating object displayed on the second operating sub-region does not cause the change of the first operating sub-region. Referring to FIG. 13, when the second operating sub-region 809 is slid from up to down, a third operating object A will be hidden, and a third operating object F will be displayed on the second operating sub-region 809, but the second operating object displayed on the first operating sub-region 806 is still what as shown in FIG. 13 and with no change, which can avoid the problem of poor system performance caused by the uploading of the large number of files in the first operating sub-region.

In another embodiment, when the second operating object displayed on the first operating sub-region is changed, the display status of the third operating object displayed on the second operating sub-region will be changed accordingly to clearly display that the third operating object corresponding to the second operating object displayed on the first operating sub-region is which one. Since L is less than or equal to N and N is generally much greater than L, in one aspect, such linkage can make the user to know the correspondence between the second operating object and the third operating object, and in another aspect, it does not bring bad effect to the system performance of electronic devices. Still referring to FIG. 13, when the first operating sub-region 806 is slid from up to down and the second operating object corresponding to the third operating object C is moved to be displayed on the first operating sub-region 806, the display status of the third operating object C is changed accordingly, for example, the display effect of the third operating object C is adjusted to a display effect different from the that of the other third operating objects.

In above each embodiment, the size of the second operating region can also be changed in accordance with the change of the number of the second operating objects, that is, the size of the second operating region is corresponding to the number of the second operating objects.

In another embodiment, the size of the second operating region is fixed, for example, the number of the second operating objects which can be displayed at each time is G, where G is an integer greater than or equal to 1. In the case where N is less than G, all objects can be displayed, and in the case where N is greater than G, G objects can be displayed in the second operating region firstly, with the G objects being selected in accordance with the size, priority or the other rules to display in the second operating region, then it is detected whether there is an operation, and in the case where the operation is detected, the second operating objects displayed on the second operating region are adjusted in response to the operation, where at least one of the adjusted second operating objects is different from the second operating object displayed on the second operating region before the adjustment.

It is assumed that there are 20 second operating objects, also as shown in FIG. 13, since only 9 objects can be displayed on the second operating region, for example, 9 second operating objects as shown in FIG. 13, when the user wants to view the other operating objects, he can slide his finger on the second operating region 803 from up to down, so the object A at the bottom of the second operating region 803 will be hidden, and the object B3 will be displayed on the second operating region 803 and the other operating objects are moved down in turn.

In another embodiment, when the blank region of the second operating region 803 is clicked by a user with an operating body, the second operating region 803 are page turned, i.e., the 9 operating objects in FIG. 13 are hidden and the next 9 operating objects are shown in the second operating region 803. The user may switch the page of the second operating region 803 by clicking.

In practice, the operation and the method for adoption can be in other forms, as long as all the second operating objects can be displayed in the second operating region. The disclosure is not limited thereto.

In the above embodiments, either the first operating region or the second operating region is particularly displayed by displaying at least one of the name and the icon for each operating object.

Above embodiments are explained by examples where the first operating region is a circular region and the second operating region is an annular-sector region. In practice, other shape can be adopted. For example, the first operating region which may be an axial symmetry region such as rectangle, regular polygon, etc. is in a first shape, while the corresponding second operating region and third operating region is in a second shape. The second shape has two non-adjacent borders. The extension lines of two non-adjacent borders of the second shape intersect within the first operating region. Preferably, the intersection point is the center of the first operating region.

Although above embodiments are explained by examples of document navigation, the method of the above embodiments can also be used in other navigation system such as the menu navigation. Accordingly, M first operating objects are M first level menu entries, and N second operating objects are N second level menu entries, which are the submenus of the ith first operating object.

Further, the L third operating objects are index entries of the N second operating objects.

Figure 14:
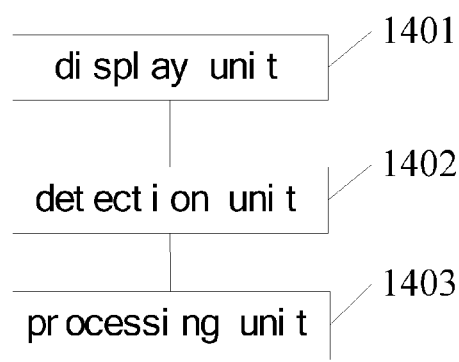
FIG. 14 is a block diagram of a function of an electronic device according to an embodiment of the disclosure.

On the basis of the same inventive conception, an electronic apparatus is further provided in the embodiment of the disclosure, such as a tablet computer, an intelligent mobile phone or a large-size tablet computer. Referring to FIG. 14, the electronic device includes: a display unit 1401, configured to display a first operating region on which M first operating objects are arranged, where M is an integer greater than or equal to 1; a detection unit 1402, configured to detect whether an first operation exists; and a processing unit 1403 includes a first processing sub-unit, configured to select the i-th first operating object from the M first operating objects in response to a first operation when it is detected that the first operation has been obtained, where i is any integer between 1 and M; determine a second operating region and N second operating objects based on the i-th first operating object, where the second operating region is different from the first operating region; and control to display the N second operating objects on the second operating region, where when the N second operating objects are displayed on the second operating region, each of the N second operating objects corresponds to a first operating sub-region, each first operating sub-region has a reference point, a connecting line of N reference points is a curve, and rules for determining the reference point on different first operating sub-regions are the same, where N is an integer greater than or equal to 1.

The display unit 1401 may be a touch display unit, and in particular a display unit that supports multi-touch.

The detection unit 1402 may be a touch unit such as a capacitive touch unit or an electromagnetic type touch unit, which may detect the operation made by the user with an operating body such as a finger or a touch pen.

The processor 1403 may be a processing chip arranged at a circuit board and connected to the detection unit 1402.

In an embodiment, the reference point on each first operating sub-region may be: a center point of each first operating sub-region; a point on each first operating sub-region which is furthest or nearest to a center of the first operating region; or a top point of each first operating sub-region.

In another embodiment, the first processing sub-unit included in the processing unit 1403 may include a processing module configured to determine the N reference points; determine a trace corresponding to the curve; align the N reference points along the trace; and display the N second operating objects.

Further, the curve may be in a shape corresponding to that of the first operating region.

In another embodiment, a distance between the curve and external borders of the first operating region may meet a predetermined condition.

Further, a second operating sub-region is further formed on the second operating region, the second operating sub-region is located between the first operating region and the first operating sub-region, and the first processing sub-unit included in the processing unit 1403 may be further configured to display L third operating objects on the second operating sub-region after the second operating region is determined, where L is an integer greater than or equal to 1.

Further, the L third operating objects are index entries of the N second operating objects.

In the aforementioned embodiments, the center of the first operating region, the center of the i-th first operating object and the center of the second operating region are arranged in a straight line.

Particularly, the first operating region is a circular region and the second operating region is an annular-sector region.

In practice, the M first operating objects are M first level menu entries, and the N second operating objects are N second level menu entries, which are the sub-menus of the i-th first operating object.

In an embodiment, the first processing sub-unit included in the processing unit 1403 is further configured to control the size of the second operating region to be corresponding to the number of the N second operating objects.

In another embodiment, the size of the second operating region is fixed and G second operating objects can be displayed at one time, where G is an integer greater than or equal to 1. The detection unit 1402 is further configured to detect the presence of first operation if N is greater than G. The first processing sub-unit included in the processing unit 1403 is further configured to adjust the second operating object displayed in the second operating region in response to a first operation when it is detected that the first operation has been obtained. At least one of the adjusted operating objects is different from the second operating object displayed in the second operating region before the adjustment.

The electronic device in the present embodiment and the method for controlling an electronic device in aforementioned embodiment are on the basis of the same inventive conception. The implementation process of the electronic device in this embodiment can be understood by those ordinary skilled in the art clearly based on the detail description of the aforementioned method for controlling an electronic device and its various variations, and will not be described again for the brevity of the description.

According to an embodiment of the disclosure, a first operating region is displayed on a display unit, and M first operating objects such as an upper-level menu or folder are arranged at the first operating region. in the case where a first operation such as an user pressing a i-th menu or clicking a i-th folder is obtained, then in response to the first operation, an electronic device may select the i-th first operating object selected by the user, determine a second operating region and N second operating objects based on the i-th first operating object, and then display the N second operating objects (for example, a lower-level menu of the i-th menu, a file of the i-th folder or other related contents) on the second operating region. When the N second operating objects are displayed on the second operating region, the N second operating objects respectively correspond to N first operating sub-regions each of which has one reference point, and a connecting line of the N reference points are connected to be is a curve. The rules for determining the reference point on different first operating sub-regions are the same, and where N is an integer equal to or greater than 1. Thus, according to the solutions of the embodiment, the operating objects may be arranged in a curve, that is, at least one of the connecting lines between the reference points is a curve, or that is, the operating objects may have different shapes and sizes, and even the shapes and sizes of all the operating objects are the same respectively, they may be arranged in a curve. Therefore, the display manners for the operating objects may be enriched and diversified, and further more, the experience of the user is improved.

Further, in an embodiment of the disclosure, a shape of the connecting line of the reference points, i.e., the curve, is corresponding to that of the first operating region, therefore, the consistence of product design is ensured.

Further, in an embodiment of the disclosure, a second operating sub-region is further formed on the second operating region, the second operating sub-region is located between the first operating region and the first operating sub-region, and L third operating objects are displayed on the second operating sub-region. With the method according to this embodiment, when a first operating object is selected, two operating regions related to the first operating object will be popped up, with each operating region has an corresponding operating object displayed thereon, so that it is unnecessary for the user to click twice, the electronic device will pop up two operating regions in response to an operation as long as it receives this operation, and thus the efficiency of human-computer interaction is improved.

Further, in an embodiment of the disclosure, the L third operating objects on the second operating sub-region are index entries of the N second operating objects. With the method according to this embodiment, when one first operating object is clicked, the second operating object and the index entry of the second operating object will be popped up at the same time, that is, two levels of menus will be presented at the same time, so that the organizational structure between the operating objects can be embodied entirely, the management of the electronic device on the operating object is facilitated, and it is convenient for the user to use. For example, if the number of the second operating objects is huge, the user can find in accordance with the index entry, but does not need to spend much time to find among the large number of second operating objects.

In an embodiment of the disclosure, a first operating region is displayed by the display unit. M first operation objects, such as upper-level menu items or file folders, are arranged at the first operating region. When a first operation is detected and obtained, for example, when the user presses the i-th menu item or clicks the i-th file folder, an electronic device may select the i-th first operation object selected by the user in response to the first operation, determine a second operating region and a third operating region based on the i-th first operation object, and display the second operating region and the third operating region on the display unit. N second operation objects, such as lower-level menu items of the i-th menu item, files in the i-th file folder or other related content, are arranged at the second operating region. L third operation objects also related to the i-th first operation object are arranged at the third operating region. It can be seen from the embodiment of the method that two operating regions related to a first operation object may pop up when the first operation object is selected, and there is a corresponding operation object in each of the two operating regions. Therefore, the user dose not have to click twice and the electronic device may only receive one operation, and then two operating regions may pop up in response to the operation, thereby improving the efficiency of human-computer interaction.

According to an embodiment of the disclosure, there is provided an electronic device control method applied to an electronic device such as a conventional panel computer, a panel computer with large size, or other electronic device that supports multi-user and multi-direction operation. The electronic device includes a display unit and a detection unit, and the detection unit may be a touch screen, a pressure sensor, a resistive screen or an electromagnetic screen.

Figure 15:
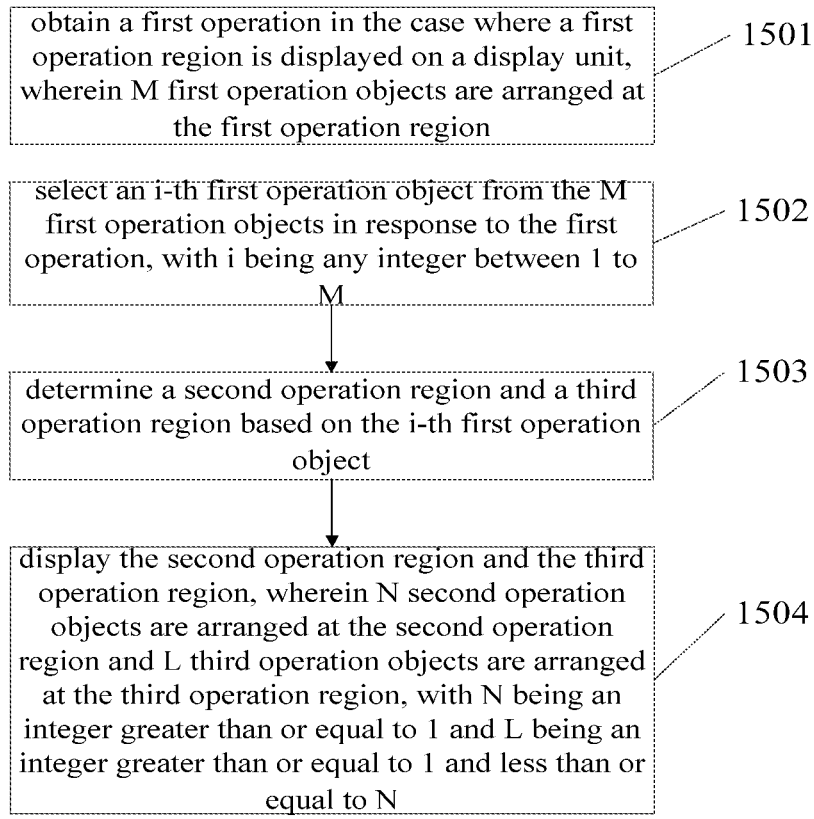
FIG. 15 is a flow chart of a method for controlling an electronic device according to an embodiment of the disclosure.

Reference is made to FIG. 15, which is a flow chart of a method for controlling an electronic device according to an embodiment of the disclosure. The method includes:

Step 1501: obtaining a first operation by a detection unit if a first operating region is displayed by a display unit, where M first operation objects are arranged at the first operating region, with M being an integer greater than or equal to 1;

Step 1502: selecting an i-th first operation object from the M first operation objects in response to the first operation, with i being any integer ranging from 1 to M;

Step 1503: determining a second operating region and a third operating region based on the i-th first operation object; and Step 1504: displaying the second operating region and the third operating region, where N second operation objects are arranged at the second operating region and L third operation objects are arranged at the third operating region, with N being an integer greater than or equal to 1 and L being an integer greater than or equal to 1 and less than or equal to N.

In the Step 1501, when a first operating region is displayed by a display unit, the first operating region may be a circle, a rectangle, an oval or other shapes. M first operation objects are arranged at the first operating region, and the first operation object may be an upper-level menu, i.e. a parent menu or a main menu, or may be a file folder or a file. In this case, the detection unit detects whether there is a first operation, for example, whether at least one of the M first operation objects is clicked by an operating body or a cursor, the first operation is obtained if the first operation is detected.

Next, the Step 1502 is performed, that is, the first operation object clicked by the operating body is selected from the M first operation objects in response to the first operation, for example, the first operation object is the i-th first operation object, with i being any integer ranging from 1 to M.

If the i-th first operation object is selected by a user, which indicates that the user wants to view or operate an lower-level menu or an lower-level file corresponding to the i-th first operation object, it is required to determine operating regions corresponding to the i-th first operation object, and the Step 1503 is executed. In the embodiment, the operating regions corresponding to the i-th first operation object include a second operating region and a third operating region. In a specific implementation process, the number of the operating regions relates to an organizational structure of files. For example, if there are two levels from the i-th first operation object to the lowest-level menu, there are two operating regions. Certainly, in a case where the i-th first operation object corresponds only to the lowest-level menu items, the lowest-level menu items may be analyzed (for example, be classified) firstly, a third operation object is determined from a result of the analyzing, and a third operating region is formed.

In a further embodiment, a second operating region and a third operating region are determined based on a display position and a display direction of the i-th first operation object on the display unit, that is to say, a display position and a display direction of the second operating region and the third operating region are determined.

Specifically, a display position may be obtained from a coordinate of the i-th first operation object on the display unit, and a display direction may be determined from an angle between a straight line from the coordinate to a reference point and a reference edge, or from an offset angle with respect to a reference point. Certainly, in a specific implementation process, other ways may also be used to determine the display position and the display direction of the i-th first operation object on the display unit, and the disclosure is not limited thereto.

Then, the second operating region and the third operating region are determined based on the display position and the display direction of the i-th first operation object on the display unit, for example, a display position and a display direction of the second operating region and the third operating region may be determined. Furthermore, the size of the second operating region and the third operating region may also be determined.

Next, the Step 1504 is performed, and the second operating region and the third operating region are displayed on the display unit. N second operation objects, for example, lower-level menus or lower-level files corresponding to the i-th first operation object, are arranged at the second operating region. The second operating region is determined from the display position and the display direction of the i-th first operation object on the display unit. Moreover, a display direction of a q-th second operation object of the N second operation objects is consistent with the display direction of the i-th first operation object. For example, an offset angle of the q-th second operation object with respect to a reference point is the same as an offset angle of the i-th first operation object with respect to the same reference point, with q being an integer greater than or equal to 1 and less than or equal to N.

In an embodiment, a position of the q-th second operation object is a center of the second operating region, and other second operation objects are distributed symmetrically with respect to the center of the q-th second operation object. Certainly, in other embodiments, the q-th second operation object may also be located at a starting position or an ending position of the second operating region.

Furthermore, in a case where the first operating region is located at a first position of the display unit, the display position of the i-th first operation object is a first display position, and the display direction of the i-th first operation object is a first display direction. In a case where the first operating region is located at a second position of the display unit, the display position of the i-th first operation object is a second display position, the display direction of the i-th first operation object is a second display direction, and the first display direction is different from the second display direction.

In another embodiment, the third operating region is located between the first operating region and the second operating region.

Figure 16A:
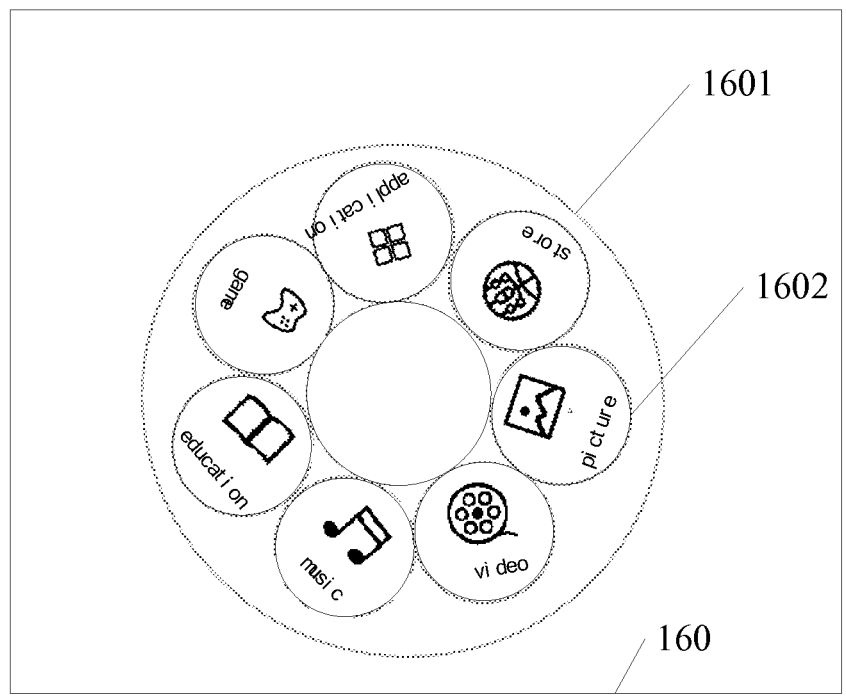
FIGS. 16*a* and 16*b* are schematic diagrams of a method for controlling an electronic device according to an embodiment of the disclosure.

Reference is made to FIG. 16a, and an electronic device includes a display unit 160. For example, a first operating region 1601 is displayed by the display unit 160, and 7 first operation objects are arranged at the first operating region 1601 after the electronic device is started up. In the embodiment, the first operating region is described by taking a circle shape as an example, and in other embodiments, the first operating region may also be an oval, a rectangle, or other shapes. The first operation object is described by taking a photo, an application store, an application, a game, education, music and video as an example. There are a file folder, such as photo and music, and a navigation menu item, such as application, in these first operation objects. Certainly, the first operation object corresponding to the application may also be treated as a file folder, and a file folder may also be treated as a navigation menu item.

Next, for example, if a user wants to browse photos, the user may select a first operation object corresponding to a photo, i.e. a first operation object 1602, by using a finger, a touch pen or a mouse, and then the electronic device may detect a first operation by using a detection unit.

Next, the Step 1502 is performed, and the first operation object 1602 is selected. Specifically, for example, highlight display or sinking may be used to indicate that a first operation object is selected, and then the user may know that the first operation object is selected.

Next, the Step 103 is performed, and a second operating region and a third operating region are determined based on the first operation object 1602. In the embodiment, for example, the first operation object 1602 corresponds to L file folders, and there are multiple photos in each of the L file folders. The third operating region is determined, and the L file folders are arranged at the third operating region. Moreover, the second operating region is determined, and multiple photos such as N photos are arranged at the second operating region.

Furthermore, the second operating region and the third operating region may be determined according to a display position and a display direction of the first operation object 1602 on the display unit 160. Specifically, a coordinate value of a center of the first operation object 1602 may be obtained directly to obtain the display position of the first operation object 1602. Moreover, a center of the first operation region 1601 may be obtained to obtain the display direction of the first operation object 1602. Specifically, a direction from a center of circle towards the center of the first operation object 1602 may be the display direction of the first operation object 1602. Then, the third operating region is determined from the display position and the display direction of the first operation object 1602. Specifically, in an embodiment, a position of a center point of the third operating region may be determined according to the display position and the display direction. The center point is located, for example, on an extension line from the center of circle to the center of the first operation object 1602. In addition, the third operating region may be arranged, for example, to be closely adjacent to the first operating region 1601 for displaying, then the position of the center of the second operating region may be determined by a preset width of the third operating region, and in this way the third operating region may be determined. That is to say, in a case where the width of the third operating region is determined, the third operating region can be determined based on the display position and the display direction of the first operation object 1602, no matter where the first operating region 1601 is moved or whether first operating region 1601 is rotated and towards which direction the first operation object 1602 is located. Similarly, the second operating region may be determined.

Figure 16B:
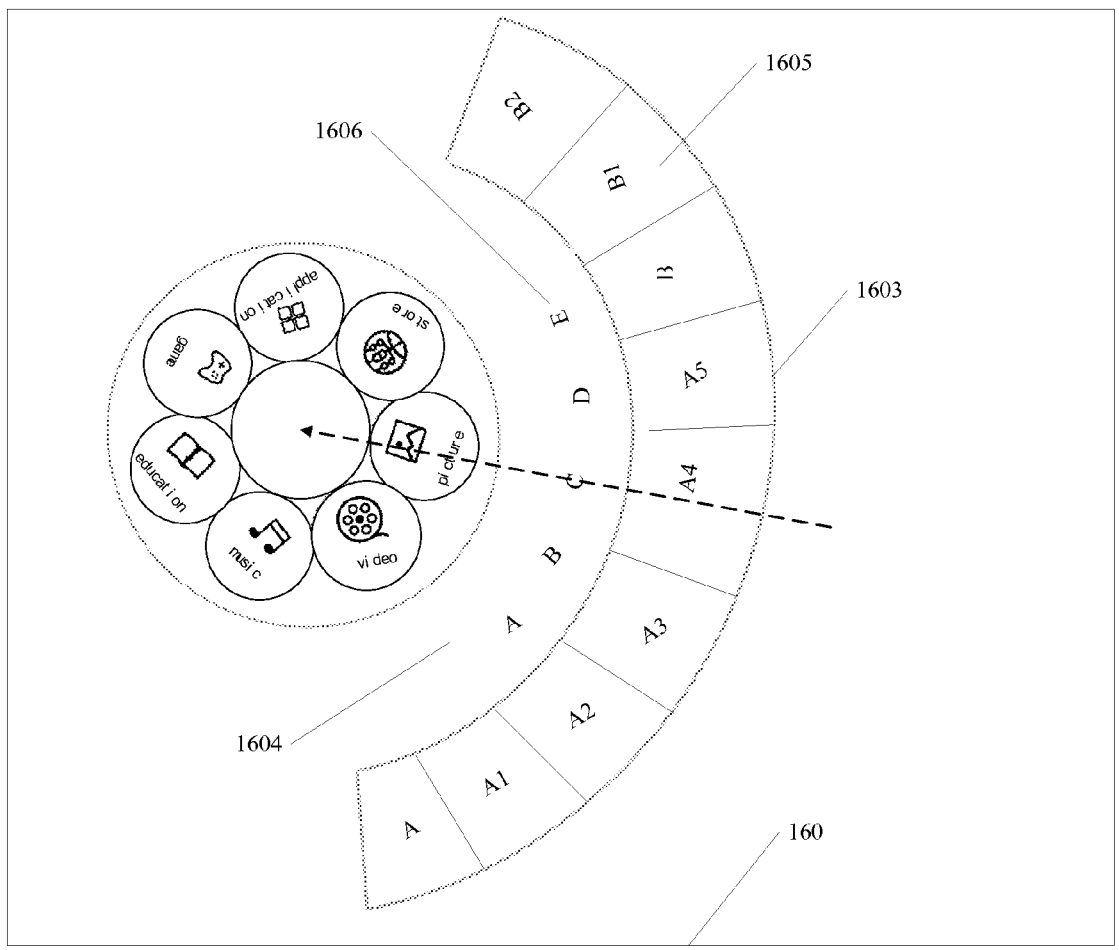

Next, the Step 1504 is performed, that is, the second operating region and the third operating region are displayed on the display unit 160. Referring to FIG. 16b, a third operating region 1604 is located between the first operating region 1601 and a second operating region 1603. In the embodiment, it is assumed that 8 third operation objects, i.e. A to H, such as a third operation object 1606, are arranged at the third operating region 1604. Moreover, at most 5 third operation objects can be displayed in the third operating region 1604 at a time. N second operation objects, such as a second operation object 1605, are arranged at the second operating region 1603. Moreover, at most 9 second operation objects can be displayed in the second operating region 1603 at a time, with N being an integer greater than 9.

When being initially displayed, the second operation objects displayed in the second operating region are displayed, for example, randomly or sequentially.

In a specific implement process, the second operation object is a photo in the first operation object 1602, such as, a photo folder. The third operation object is a subfolder in the first operation object 1602, such as, the photo folder, and is an index entry of the second operation object. In this embodiment, a second display object in the second operating region is arranged and displayed in order of the third operation objects, and is arranged and displayed in order of the second operation objects corresponding to the third operation object, when the second display object is displayed initially. As shown in FIG. 16b, the i-th third operation object is the third operation object A, and the top 5 operation objects arranged in the folder A are respectively second operation objects A1 to A5. Furthermore, in FIG. 16b, not all the display positions in the second operating region 1603 are occupied, since there are only 5 second operation objects in the folder A. Hence, second operation objects B1 to B5 corresponding to the third operation object B are displayed sequentially.

In addition, in FIG. 16b, the second operation object and the third operation object are arranged and displayed in counter-clockwise order. Certainly, in practice, the second operation object and the third operation object may also be arranged and displayed in clockwise order.

Furthermore, FIG. 16b shows that, the second operating region 1603 is fan-annular, in which a dashed line with an arrow is a connecting line between the center of the first operating region 1601 and the center of the first operation object 1602, and the direction indicated by the arrow represents the display direction of the first operation object 1602, which is the direction toward the center of the first operating region in this embodiment. The center of the second operating region 1603 is also located on the dashed line, and the second operating region 1603 is an axisymmetric shape with respect to the dashed line. The display direction of a q-th second operation object in the second operation objects coincides with the display direction of the first operation object 1602. In this embodiment, the q-th second operation object is the second operation object A4. The center of the second operation object A4 is the center of the second operating region 1603. The center of the first operation object 1602 is aligned with the center of the second operation object 1605. The third operating region 1604 is also fan-annular which is defined by the borders of the first operating region 1601 and the second operating region 1603. The display direction of one operation object in the third operation objects coincides with the display direction of the first operation object 1602, and the center of the third operating region 1604 is also located on the dashed line.

The above-mentioned process shows that, by means of the method for controlling an electronic device according to the embodiment, two operating regions related to the first operation object may be popped up when the first operation object is selected, and there is a corresponding operation object in each of the two operating regions. Therefore, the user dose not have to click twice and the electronic device may only receive one operation, and then two operating regions may be popped up in response to the operation, thereby improving the efficiency of human-computer interaction.

Next, the further implementation process of the method for controlling an electronic device according to the embodiment is further described.

For example, the user may click the third operation object B by using a finger or a touch-control pen if the user wants to browse the second operation objects corresponding to the third operation object B. And then the detection unit of the electronic device may obtain a second operation which is the operation for clicking the j-th third operation object.

Then, the j-th third operation object is selected in response to the second operation, wherein j is any integer between 1 to L. The second operation objects corresponding to the j-th third operation object are displayed in a main region of the second operating region.

The main region represents different meanings in different circumstances. For example, in the case where the number of the second operation objects corresponding to the third operation object B is larger than 9, the top 9 operation objects of the second operation objects are displayed in the second operating region 1603. In this case, all of the second operation objects in the second operating region 1603 are the second operation objects corresponding to the third operation object B, and the whole display region of the second operating region 1603 is the main region, as shown in FIG. 17*a*.

Figure 17A:
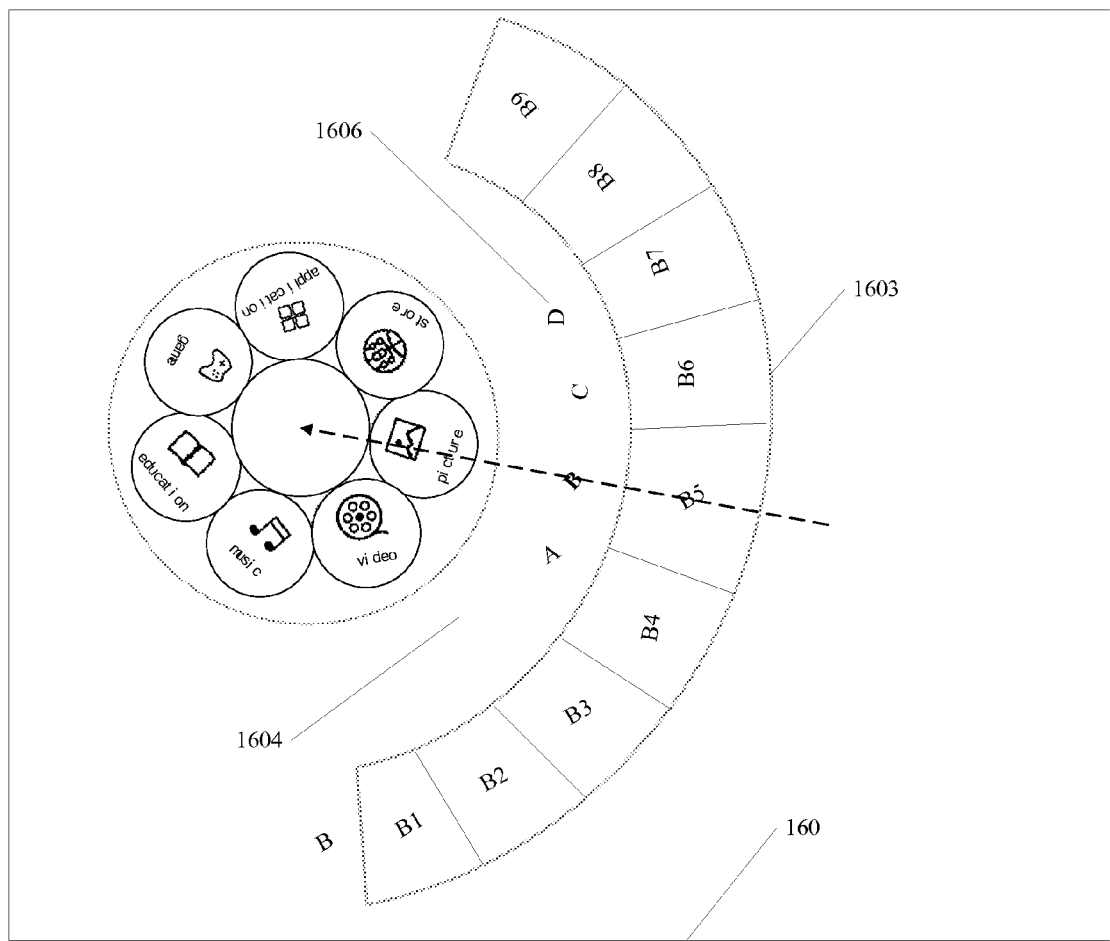
FIGS. 17*a* and 17*b* are schematic diagrams of a method for controlling an electronic device according to another embodiment of the disclosure.

Furthermore, referring to FIG. 17*a*, all of the 9 second operation objects B1 to B9 are displayed in the second operating region 1603, and the center of the second operation object B5 is the center of the second operating region 1603.

Figure 17B:
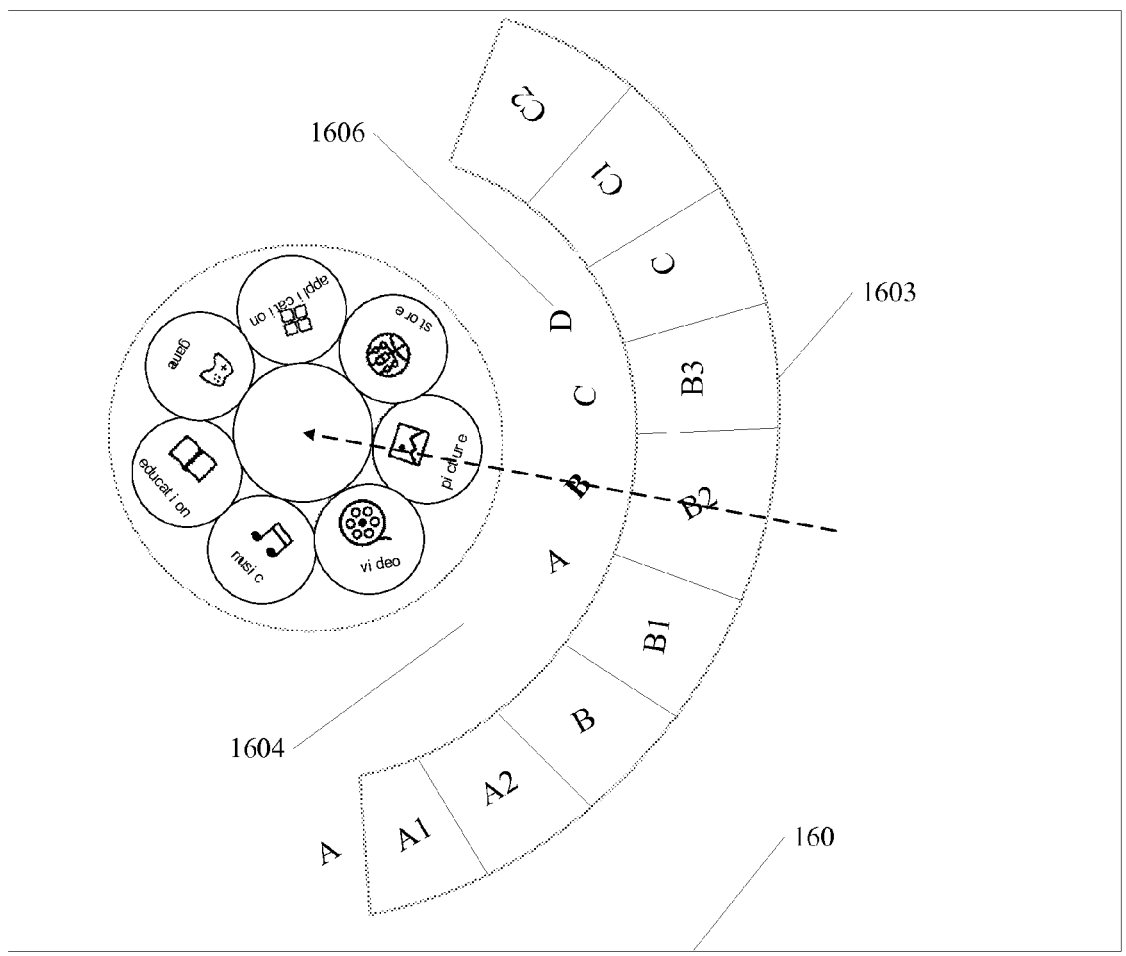

Next, referring to FIG. 17*b*, in the case where there are only 3 second operation objects corresponding to the third operation object B, namely, the second operation objects B1 to B3, the second operation objects corresponding to the third operation object are displayed in the main region. That is to say, the second operation object B2 located at the middle position in the second operation objects is displayed in the middle position of the second operating region 1603, and the second operation object B1 and the second operation object B3 are arranged and displayed on both sides of the second operation object B2 respectively. The display position which does not occupied by the second operation objects corresponding to the third operation object B may be displayed the second operation objects corresponding to a previous third operation object and a next third operation object of the third operation object B orderly. The second operation object A1 and the second operation object A2 shown in FIG. 17*b* are the second operation objects corresponding to the previous third operation object A of the third operation object B. In FIG. 17*b*, the number of the displayed second operation objects which correspond to the third operation object B is odd.

In the case where the number of the displayed second operation objects which correspond to the third operation object B is even, the second operation objects corresponding to the third operation object are displayed in the main region, that is to say, the middle position between two second operation objects midmost in the second operation objects moves to the center position of the second operating region 1603, and other second operation objects are arranged on both sides of the two midmost second operation objects sequentially.

The above description shows that the main region in the second operating region 1603 is a region used to display the second operation objects corresponding to the selected third operation object. The main region is a region extending from the center of the second operating region 1603 towards both sides of the center of the second operating region 1603 by a certain distance, and the extended distance is related to the number of the second operation objects.

With continued reference to FIG. 17*a*, in order for the user to know at a glance that the second operation object corresponding to which the third operation object is spread in the second operating region 1603, a j-th third operation object is displayed with a first display effect and other third operation objects other than the j-th third operation object is displayed with a second display effect if the j-th third operation object is selected. The first display effect is different from the second display effect. In FIG. 17*a*, the third operation object B is display in bold and other third operation objects are display in a normal font. However, in practice, the first display effect may be, for example, highlighted display, or display in sinking, or display with different color, as long as the j-th third operation object and other third operation objects may be distinguished.

Furthermore, the display position of the third operation objects may also be moved in the third operating region 1604. The j-th third operation object is moved to the position aligned with the first operation object, that is to say, the center of the j-th third operation object is located on the dashed line. In this case, the second operation objects corresponding to the j-th third operation object are distributed symmetrically with respect to the center of the j-th third operation object, as shown in FIG. 17*a* and FIG. 17*b*.

In a further embodiment, the size of the third operating region 204 is fixed and there are G third operation objects displayed at a time, where G is an integer greater than or equal to 1. In the case where N is less than G, all of the third operation objects may be displayed. In the case where L is larger than G, as shown in FIG. 16*b*, there are 9 third operation objects each from the third operation object A to the third operation object I. However, there are 5 third operation objects displayed at a time, that is to say, the third operation object A to the third operation object E are displayed at a time. In this case, the display method according to the embodiment further includes: obtaining a third operation by the detection unit; and adjusting the third operation objects displayed in the third display region in response to the third operation, where at least one operation object of the adjusted third operation objects is different from the third operation objects displayed in the third operating region before the adjustment, where the second operation objects displayed in the second operating region remain unchanged.

The G third operation objects may be selected and displayed in the third operating region according to the size, the priority or other principles.

With continued reference to FIG. 16b, the third operation object A to the third operation object E are displayed currently on the third operating region 1604. When the user wants to view other third operation objects, the user may slide from the top to down on the third operating region 1604 by using a finger. Hence, the third operation object A located at the nethermost of the third operating region 1604 may be hidden, other third operation objects move down sequentially and the third operation object F may be displayed in the third operating region 1604.

In another embodiment, alternatively, the third operating region 1604 may be turned in whole page in the case where the user clicks the blank region of the third operating region 1604 by using an operation body. That is to say, all of 5 third operation objects in FIG. 16b may be hidden and the remaining 4 third operation objects may be displayed in the third operating region 1604. The user may switch the page of the third operating region 1604 by clicking.

In the above-mentioned embodiments, the size of he third operating region 1604 further may be changed depending on the change of the number of the third operation objects, that is to say, the size of the third operating region 204 keeps up with the number of L third operation objects. For example, in the case where there are only 5 third operation objects, as shown in FIG. 16b, the third operating region 1604 is only same as shown in FIG. 16b. In the case where there are 9 third operation objects, the third operating region 204 becomes bigger correspondingly.

Certainly, in practice, the third operation may also be an operation in other way, and adjusting manner may also be in other way, as long as all of the third operation objects can be displayed in the third operating region 1604, which is not limited in the disclosure.

In the above-mentioned embodiments, in the case where the third operation objects displayed in the third operating region 1604 are changed by regardless of sliding or page turning, the second operation objects in the second operating region 203 may be not changed with the change of the third operation object because there is larger data bulk of the second operation objects. The unnecessary burden may be produced for the system performance if the second operation objects in the second operating region 1603 are rotated with the change of the third operation object. Therefore, the second operating region is not synchronously changed if the third operation object displayed in the third operating region is changed, thereby avoiding poor system performance caused by large number of files being loaded in the second operating region.

Furthermore, the display effect of the third operation objects is not changed.

In another embodiment, in the case where the third operation is a sliding operation and the i-th third operation object A is slid, the method according to the embodiment further includes: detecting whether the sliding distance of the sliding operation on the display unit 160 is larger than a predetermined value; and displaying again the third operation objects displayed in the third operating region 1604 before the adjustment in the third operating region 1604 if the sliding distance is larger than the predetermined value.

In the situation as shown in FIG. 16b, if the user slides from the down to top on the third operating region 1604 by using a finger, the third operation object E located at the top of the third operating region 1604 may be slid out of the display position of the third operating region 1604 and be hidden, and other third operation objects move up sequentially. That is to say, all of the third operation objects move up along with the sliding operation based on the sliding distance of the third operation. However, after the sliding distance exceeds a certain distance, that is to say, the sliding distance is larger than the predetermined value, the third operation objects do not move up along with the sliding operation no matter whether the finger of the user moves away from the display unit 160. The third operation objects displayed in the third operating region 1604 before the adjustment are displayed again in the third operating region 1604, that is to say, it still becomes the situation in FIG. 16b, which is referred to as a pop back effect.

In another embodiment, in the situation as shown in FIG. 17a, a third operation is performed. In this case, the i-th third operation object A is displayed again to the position aligned with the first operation object 1602, and the second operation objects corresponding to the third operation object A are displayed in the main region of the second operation object 1603.

Similarly, the same processing way is used for the last third operation object I, except that the sliding direction opposites to that in the previous embodiments, which is not described in detail herein.

In the above-mentioned embodiments, the predetermined value is set as, for example, the sliding distance generated when the i-th third operation object A is slid out of the display region of the third operating region 1604.

In another embodiment, when a second operation object is rotated in a second operating region 1603 by a user, a fourth operation is detected and obtained by an electronic device through a detection unit. The N second operation objects are moved in a first direction in response to the fourth operation. The first direction is related to the fourth operation. For example, the first direction is a clockwise direction, in the case that the fourth operation is a clockwise sliding operation; and the first direction is a counterclockwise direction, in the case that the fourth operation is a counterclockwise sliding operation.

A s-th third operation object is displayed on the third operating region in the case that the border of the second operation object in the second operating region 1603 corresponding to the s-th third operation object moves in the first direction and passes through an extension line of a connection line between the center of the first operating region 1601 and the center of the i-th first operation object. The border is consistent with the first direction, that is, in the case that the first direction is a clockwise direction, the border is referred to the border in the clockwise direction of the second operation object, and in the case that the first direction is a counterclockwise direction, the border is referred to the border in the counterclockwise direction of the second operation object. S is any integer ranging from 1 to L.

Figure 18:
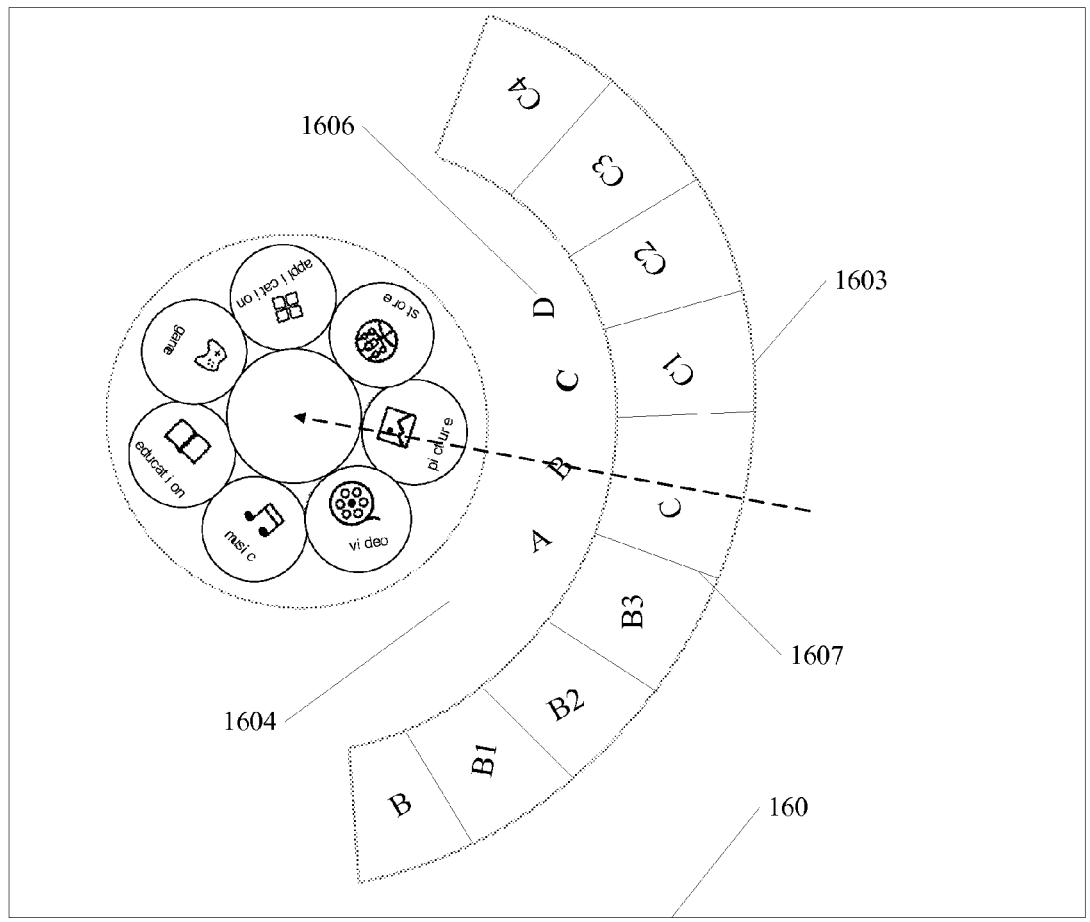
FIG. 18 is a schematic diagram of a display method according to yet another embodiment of the disclosure.

Next, referring to FIG. 18, the third operation object C is displayed in the third operating region 1604 when the second operation object in the case shown in FIG. 3b is clockwise moved to a position shown in FIG. 4 in which the second operation object corresponding to the third operation object A is already moved out of the display region of the second operating region 1603 and the border 1607 of the second operation object corresponding to the third operation object C already passes through a dotted line, that is, the extension line of a connection line between the center of the first operating region 1601 and the center of the i-th first operation object (that is, the first operation object 1602). The border 1607 of the second operation object described herein is referred to the border of the third operation object C which is displayed in the second operating region. Of course, in other embodiments, the border 1607 of the second operation object may be the border 1607 of the second operation object itself which corresponds to the third operation object C.

In FIG. 18, the s-th third operation object which is the third operation object C is already displayed in the third operating region before a fourth operation is obtained. Displaying the s-th third operation object in the third operating region in this embodiment includes: displaying the s-th third operation object with a first effect and displaying other third operation object of the L third operation objects other than the s-th third operation object with a second effect, where the first effect is different from the second effect.

For example, the third operation object B is displayed with the first effect in FIG. 17b, that is, the third operation object B is highlighted. Therefore, the third operation object C is displayed with the first effect and other third operation objects are displayed with the second effect in FIG. 18, to inform the user that the current third operation object is already switched. The first effect and the second effect are similar to that of the above embodiments, which are not described herein.

In another embodiment, in the case where the s-th third operation object is not displayed in the third operating region 1604 before a fourth operation is obtained, displaying the s-th third operation object in the third operating region includes: moving the s-th third operation object to the third operating region 1604 to display the s-th third operation object; and displaying the s-th third operation object with a first effect and displaying other third operation object of the L third operation objects other than the s-th third operation object with a second effect, where the first effect is different from the second effect.

Specifically, for example, the s-th third operation object is a third operation object F which is not yet displayed in the third operating region 1604 in FIG. 17b, the third operation objects in the third operating region 1604 may be clockwise moved until the third operation object F is moved into the third operating region 1604 and displayed on the display unit 160. Next, the third operation object F may also be highlighted, that is, the third operation object F is displayed with the first effect, then other third operation objects is displayed with the second effect. The first effect and the second effect are similar to that of the above embodiments, which is not described herein.

In a further embodiment, the s-th third operation object may also be displayed at a position on the extension line in the third operating region 1604. The extension line is an extension line of a connection line between the center of the first operating region 1601 and the center of the i-th first operation object (that is, the first operation object 1602).

The display status of the third operation object in the third operating region may be synchronously changed by changing the second operation object. Hence, it's clearly shown that which of the third operation objects is the one corresponding to the second operation object displayed in the main region. Moreover, L is less than or equal to N, and usually N is much larger than L. Because of such synchronous change, on one hand, it is possible for the user to know the corresponding relationship between the second operation object and the third operation object; on the other hand, no bad influence on the system performance of the electronic device is brought.

In a further embodiment, in the case that in FIG. 17a the last second operation object is moved, that is, the last second operation object of the second operation objects corresponding to the third operation object I is clockwise moved, that whether the sliding distance of the fourth operation is larger than a predetermined value is detected, and the second operation objects displayed in the second operating region 1603 before the movement is displayed again in the second operating region 1603 if the sliding distance of the fourth operation is larger than the predetermined value. Of course, the second operation objects displayed in the second operating region 1603 may be displayed again in some other way in practice.

In the above embodiments, the first operating region is described by taking a circular region as an example, the second operating region and the third operating region are described by taking a flabellate annular region as an example. However, the operating regions may be designed into other shapes in practice. For example, the first operating region may be an axisymmetric region such as rectangle or regular polygon and is in a first shape. Correspondingly, the second operating region and the third operating region are in a second shape, where the second shape is with two non-adjacent borders, and the extension lines of the two non-adjacent borders intersect in the first operating region. Preferably, the point of the intersection is the center point of the first operating region.

In the above embodiments, the illustration is made by taking file navigation as an example. However, the method according to the embodiments of the disclosure may also be used in other navigation systems such as menu navigation. Correspondingly, the M first operation objects are M first-level menu items, the N second operation objects are N second-level menu items, and the L third operation objects are index entries of N second-level menu items. The N second-level menu items are lower-level menus of the i-th first operation object.

Figure 19:
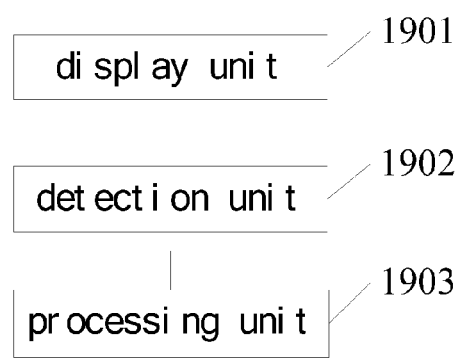
FIG. 19 is a block diagram of a function of an electronic device according to an embodiment of the disclosure.

An embodiment of the disclosure also provides an electronic device such as tablet computers, smart phones, or large-size tablet computers based on the same inventive concept. Referring to FIG. 19, the electronic device includes: a display unit 1901, configured to display a first operating region, where M first operation objects are arranged at the first operating region, with M being an integer greater than or equal to 1; a detection unit 1902, configured to detect and obtain a first operation; and a processing unit 1903 with a second processing sub-unit, configured to select the i-th first operation object from the M first operation objects in response to the first operation, with i being any integer ranging from 1 to M; to determine a second operating region and a third operating region based on the i-th first operation object; and to control the second operating region and the third operating region to be displayed on the display unit 1901, where N second operation objects are arranged at the second operating region and L third operation objects are arranged at the third operating region, with N being an integer greater than or equal to 1 and L being an integer greater than or equal to 1 and less than or equal to N.

The display unit 1901 may be a touch display unit, and specifically may be a display unit supporting multi-touch.

The detection unit 1902 may be a touch screen, a pressure sensor, a resistive screen or an electromagnetic screen, for example.

The processing unit 1903 may be a processing chip provided on the circuit board of the electronic device and connected to the detection unit 1902.

In an embodiment, the second operating region has a main region for displaying a second operation object corresponding to a selected third operation object, and after the second operating region and the third operating region are controlled to be displayed by the display unit 1901, the detecting unit 1902 is further configured to detect and obtain a second operation, where the second operation is an operation to click a j-th third operation object of the L third operation objects; and the second processing sub-unit included in the processing unit 1903 is further configured to select the j-th third operation object in response to the second operation, with j being any integer ranging from 1 to L; and to control the second operation object corresponding to the j-th third operation object to be displayed on the main region.

Furthermore, the second processing sub-unit included in the processing unit 1903 is further configured to control the j-th third operation object to be displayed with a first effect and other third operation object of the L third operation objects other than the j-th third operation object to be displayed with a second effect, where the first effect is different from the second effect.

In another embodiment, the size of the third operating region is fixed and there are G third operation objects displayed in the third operating region at a time, with G being an integer greater than or equal to 1, and where, in the case where L is larger than G, after the second operating region and the third operating region are displayed, the detection unit 1902 is further configured to detect and obtain a third operation; and the second processing sub-unit included in the processing unit 1903 is further configured to adjust the third operation objects displayed in the third display region in response to the third operation, where at least one operation object of the adjusted third operation objects is different from the third operation objects displayed in the third operating region before the adjustment, where the second operation objects displayed in the second operating region remain unchanged.

Furthermore, in the case where the third operation is a sliding operation and the i-th third operation object is slid, the second processing sub-unit included in the processing unit 1903 is further configured to detect whether the sliding distance of the sliding operation on the display unit 1901 is larger than a predetermined value after in response to the third operation, and display again, in the third operating region, the third operation objects displayed in the third operating region before the adjustment if the sliding distance is larger than the predetermined value.

In another embodiment, after the second operating region and the third operating region are displayed, the detection unit 1902 is further configured to detect and obtain a fourth operation; and the second processing sub-unit included in the processing unit 1903 is further configured to move the N second operation objects in a first direction in response to the fourth operation; and to display a s-th third operation object in the third operating region, when the border of the second operation object in the second operating region corresponding to the s-th third operation object moves in the first direction and passes through an extension line of a connection line between the center of the first operating region and the center of the i-th first operation object, with s being any integer ranging from 1 to L.

Furthermore, in the case where the s-th third operation object is displayed in the third operating region before the detection unit 1902 detects and obtains the fourth operation, the second processing sub-unit included in the processing unit 1903 is configured to display the s-th third operation object with a first effect and display other third operation object of the L third operation objects other than the s-th third operation object with a second effect, where the first effect is different from the second effect.

Furthermore, in the case where the s-th third operation object is not displayed in the third operating region before the detection unit 1902 detects and obtains the fourth operation, the processing unit 1903 is configured to move the s-th third operation object to the third operating region to display the s-th third operation object; and to control the s-th third operation object to be displayed with a first effect and other third operation object of the L third operation objects other than the s-th third operation object to be displayed with a second effect, where the first effect is different from the second effect.

Furthermore, the second processing sub-unit included in the processing unit 1903 is configured to control the s-th third operation object to be displayed at a position on the extension line in the third operating region.

In the above embodiments, the center of the first operating region, the center of the i-th first operation object and the center of the second operating region are located on the same straight line.

In the above embodiments, the first operating region is described by taking a circular region as an example, and the second operating region and the third operating region are described by taking a flabellate annular region as an example. However, the operating regions may be designed into other shapes in practice. For example, the first operating region may be an axisymmetric region such as a rectangle region, a regular polygon region or the like and is in a first shape. Correspondingly, the second operating region and the third operating region are in a second shape, where the second shape is with two non-adjacent borders, and the extension lines of the two non-adjacent borders intersect in the first operating region. Preferably, the point of the intersection is the center point of the first operating region.

In the above embodiments, the file navigation is taken as an example for illustration. However, the method according to the present embodiment may also be applied to other navigation systems, such as menu navigation. Hence, correspondingly, M first operation objects are M first-level menu items, N second operation objects are N second-level menu items, and L third operation objects are the index entries of the N second operation objects, where the N second menu items are sub-menus of the i-th first operation object.

The electronic device according to the present embodiment and the method for controlling an electronic device according to the preceding embodiments are the disclosures based on the same inventive concept. According to a preceding detailed description of the electronic device control method and various variations thereof, those skilled in the art may clearly know the implementation of the electronic device according to the present embodiment, which is not repeated herein for a brief specification.

According to the embodiment of the disclosure, the first operating region is displayed on the display unit. The M first operation objects, such as upper-level menu items or file folders, are arranged at the first operating region. When the first operation is detected and obtained, for example, when the user presses the i-th menu item or clicks the i-th file folder, the electronic device may select the i-th first operation object selected by the user in response to the first operation, determine the second operating region and the third operating region based on the i-th first operation object, and display the second operating region and the third operating region on the display unit, where the third operating region is located between the first operating region and the second operating region. The N second operation objects, such as lower-level menu items of the i-th menu item, files in the i-th file folder or other related content, are arranged at the second operating region. The L third operation objects also related to the i-th first operation object are arranged at the third operating region. It can be seen from the embodiment of the method that two operating regions related to a first operation object may be popped up when the first operation object is selected, and there is a corresponding operation object in each of the two operating regions. Therefore, the user dose not have to click twice and the electronic device may only receive one operation, and then two operating regions may be popped up in response to the operation, thereby improving the efficiency of human-computer interaction.

Furthermore, according to an embodiment of the disclosure, the L third operation objects in the third operating region are the index entries of the N second operation objects. In the embodiment of the method, both the second operation objects and the index entries of the second operation objects may be popped up after a first operation object is clicked, i.e. two levels of menus may appear simultaneously. Therefore, the organizational structure of the operation objects may be embodied entirely, the management to the operation objects by the electronic device is facilitated and the operation of the user is facilitated. For example, the user may search in accordance with the index entries, without spending a lot of time in searching among the large number of second operation objects if the number of the second operating objects is huge.

Furthermore, according to the embodiment of the disclosure, the display of the second operation object may be adjusted and the second operation object corresponding to the j-th third operation object may be displayed in the second operating region in the case where the j-th third operation object is selected. That is to say, the display status of the second operation object may be changed by clicking the third operation object. Therefore, according to the embodiment of the method, the display status of the second operation object may be adjusted rapidly by selecting the third operation object, and the second operation object corresponding to the selected third operation object may be rapidly displayed in the second operating region.

Furthermore, according to the embodiment of the disclosure, the second operation object displayed in the second operating region remains unchanged in the case where the third operation object displayed in the third operating region is adjusted in response to a trigger action. That is to say, the second operating region is not synchronously changed with the changing of the third operation object displayed in the third operating region, thereby avoiding poor system performance caused by large number of files being loaded in the second operating region.

Furthermore, according to the embodiment of the disclosure, the display status of the third operation object in the third operating region may be synchronously changed in the case where the second operation object displayed in the main region of the second operating region is changed. Hence, it's clearly shown that which of the third operation objects is the one corresponding to the second operation object displayed in the main region. Moreover, L is less than or equal to N, and usually N is much larger than L. Because of such synchronous change, on one hand, it is possible for the user to know the corresponding relationship between the second operation object and the third operation object; on the other hand, no bad influence on the system performance of the electronic device is brought.

Those skilled in the art should understand that, the embodiment of the disclosure may be implemented as a method, a system or a computer program product. Therefore, the disclosure can be implemented in the form of only hardware embodiment, only software embodiment or an embodiment of a combination of software and hardware. In addition, the disclosure can be implemented in the form of a computer program product which can be implemented by one or more computer available storage medium (including but not limited to a disc memory and an optical memory, etc) containing computer available program codes.

The electronic device provided by the embodiments of the disclosure has a multi-person sharing mode (i.e., a multi-person using mode) and a traditional single-person full screen mode. The electronic device provided by the embodiments of the disclosure may effectively switch between the multi-person sharing mode and the traditional single-person full screen mode. The switching between the two modes described above can be achieved by the triggering from a button and can also be achieved by the triggering from an input gesture/an operating gesture. Of course, the switching can be achieved by the following way: an application is started under the traditional single-person full screen mode, and when the application is running, the interaction interface of the application and the interaction mode corresponding to the interaction interface belong to the multi-person sharing mode. In addition, the multi-person sharing mode (i.e., the multi-person using mode) may be supported by the first hardware system and the first operating system supported by the first hardware system (for example, the hardware processing system based on ARM hardware framework and the android system), and the traditional single-person full screen mode may be supported by the second hardware system (for example, the hardware processing system based on the X86 hardware framework and the windows system). When the switching between the two modes described above corresponds to the switching between the corresponding hardware systems and software systems.

The disclosure is described with reference to the flow charts and/or the block diagrams of the methods, the apparatus (the system) and the computer program products according to the embodiments of the disclosure. It should be understood that, each flow and/or block in the flow charts and/or the block diagrams and a combination of the flows and/or the blocks in the flow charts and/or the block diagrams may be achieved by the computer program instructions. These computer program instructions may be provided to a general-purpose computer, a dedicated computer, an embedded processor or processors of other programmable data processing apparatus to generate a machine, such that a device for achieving the function specified in one or more flow in the flow charts and/or one or more block in the block diagrams is generated by performing the instructions by the computer or the processors of other programmable data processing apparatus.

These computer program instructions may be stored in a computer readable memory which may guide the computer or other programmable data processing apparatus to work in the specific way, such that the instructions stored in the computer readable memory generate manufactures including an instruction device, which achieves the function specified in one or more flow in the flow charts and/or one or more blocks in the block diagrams.

These computer program instructions may be loaded into the computer or other programmable data processing apparatus, such that a series of operating steps are performed on the computer or other programmable apparatus to generate the process achieved by the computer, thereby the instructions performed on the computer or the programmable apparatus provide steps for achieving the function specified in one or more flow in the flow charts and/or one or more block in the block diagrams.

Obviously, those skilled in the art may make various changes and modifications to the disclosure without departing from the spirit and scope of the disclosure. Therefore, if these changes and modifications to the disclosure fall within the scope of protection of the claims of the disclosure and the equivalent technology thereof, the disclosure is intended to include the changes and modifications.

The invention claimed is:

1. A method for controlling an electronic device, applied to an electronic device, the electronic device comprising a display unit, and the method comprising:

displaying a first operating region on the display unit, with M first operation objects being arranged at the first operating region, where M is an integer greater than or equal to 1, a display direction of each of the M first operations is identical to a radial from a central of the first operating region to a center of each of the M first operations;

selecting an i-th first operation object from the M first operation objects in response to a first operation in the case where the first operation is detected and obtained, where i is any integer between 1 and M, the first operation is detected by a sensor unit arranged in the display unit;

determining a second operating region based on a display position and a display direction of the i-th first operation object on the display unit; and displaying the second operating region, with N second operation objects being arranged at the second operating region, and a display direction of a q-th second operation object of the N second operation objects being identical to the display direction of the i-th first operation object, where N is an integer greater than or equal to 1, and q is an integer greater than or equal to 1 and less than or equal to N, wherein the display position of the i-th first operation object is a first display position and the display direction of the i-th first operation object is a first display direction in the case where the first operating region is located at a first position on the display unit; the display position of the i-th first operation object is a second display position and the display direction of the i-th first operation object is a second display direction in the case where the first operating region is located at a second position on the display unit, and the first display direction is different from the second display direction;

wherein in a case that the display unit supports multi-touch, after displaying a first operating region, the method further comprises:

selecting a j-th first operation object from the M first operation objects in response to a second operation in the case where the second operation is detected, wherein the j-th first operation object is adjacent to the i-th first operation object, j is any integer between 1 and M which is different from i, and the second operation is detected by the sensor unit;

determining a fourth operating region based on a display position and a display direction of the j-th first operation object on the display unit;

displaying the fourth operating region, with S second operation objects being arranged at the fourth operating region, and a display direction of the k-th second operation object of the S second operation objects being identical to the display direction of the j-th operation object, wherein the fourth operating region is not completely overlapped with the second operating region, S is an integer greater than or equal to 1, and k is an integer greater than or equal to 1 and less than or equal to S, wherein the display position of the j-th first operation object is a third display position and the display direction of the j-th first operation object is a third display direction in the case where the first operating region is located at the first position; the display position of the j-th first operation object is a fourth display position and the display direction of the j-th first operation object is a fourth display direction in the case where the first operating region is located at the second position, and the third display direction is different from the fourth display direction.

2. The method according to claim 1, wherein displaying a first operating region comprises: displaying at least one of name and icon of each of the M first operation objects; and displaying the second operating region comprises: displaying at least one of name and icon of each of the N second operation objects.

3. The method according to claim 1, wherein after displaying the second operating region, the method further comprises:

determining N preview areas respectively corresponding to the N second operation objects based on the display position and the display direction of each of the N second operation objects; and displaying the N preview areas, wherein each of the N preview areas displays thereon at least one preview file corresponding to a corresponding one of the N second operation objects.

4. The method according to claim 3, wherein after displaying the N preview areas, the method further comprises:

selecting a p-th second operation object from the N second operation objects in response to a third operation in the case where the third operation is detected, where p is any integer between 1 and N; and changing a preview area in the N preview areas corresponding to the p-th second operation object into a selectable area.

5. The method according to claim 1, wherein N second operation objects being arranged at the second operating region comprises:

displaying the N second operating objects on the second operating region, wherein each of the N second operating objects corresponds to a first operating sub-region, each first operating sub-region has a reference point, a connecting line of N reference points is a curve, and rules for determining the reference point on different first operating sub-regions are the same.

6. The method according to claim 5, wherein the reference point on each first operating sub-region is:

a center point of each first operating sub-region; or a point on each first operating sub-region which is furthest or nearest to a center of the first operating region; or a top point of each first operating sub-region.

7. The method according to claim 5, wherein displaying the N second operating objects on the second operating region comprises:

determining the N reference points;

determining a trace corresponding to the curve;

aligning the N reference points along the trace; and displaying the N second operating objects.

8. The method according to claim 5, wherein a distance between the curve and external borders of the first operating region meet a predetermined condition.

9. The method according to claim 8, wherein a second operating sub-region is further formed on the second operating region, the second operating sub-region is located between the first operating region and the first operating sub-region, and after determining a second operating region the method further comprises:

displaying L third operating objects on the second operating sub-region, where L is an integer greater than or equal to 1.

10. The method according to claim 1, the method further comprising:
  determining a third operation region based on the i-th first operation object; and
  displaying the third operation region, wherein L third operation objects are arranged at the third operation region, with L being an integer greater than or equal to 1 and less than or equal to N.

11. The method according to claim 10, wherein the second operation region has a main region for displaying a second operation object corresponding to a selected third operation object, and after displaying the second operation region and the third operation region, the method further comprises:
  obtaining a second operation by detecting, wherein the second operation is an operation to click a j-th third operation object of the L third operation objects;
  selecting the j-th third operation object in response to the second operation, with j being any integer ranging from 1 to L; and
  displaying the second operation object corresponding to the j-th third operation object in the main region.

12. The method according to claim 11, wherein, by selecting the j-th third operation object, the method further comprises:
  displaying the j-th third operation object with a first effect and displaying other third operation object of the L third operation objects other than the j-th third operation object with a second effect, wherein the first effect is different from the second effect.

13. The method according to claim 10, wherein the size of the third operation region is fixed and G third operation objects are displayed on the third operation region at a time, with G being an integer greater than or equal to 1, and
  wherein, in the case where L is larger than G, after displaying the second operation region and the third operation region, the method further comprises:
  obtaining a third operation by detecting; and
  adjusting the third operation objects displayed in the third display region in response to the third operation, wherein at least one operation object of the adjusted third operation objects is different from the third operation objects displayed in the third operation region before the adjustment, and the second operation objects displayed in the second operation region remain unchanged.

14. The method according to claim 13, wherein, in the case where the third operation is a sliding operation and a i-th third operation object is slid, after in response to the third operation, the method further comprises:
  detecting whether a sliding distance of the sliding operation on the display unit is larger than a predetermined value; and
  displaying again, in the third operation region, the third operation objects displayed in the third operation region before the adjustment if the sliding distance is larger than the predetermined value.

15. An electronic device, comprising:
  a display unit, configured to display a first operating region, with M first operation objects being arranged on the first operating region, where M is an integer greater than or equal to 1, a display direction of each of the M first operations is identical to a radial from a central of the first operating region to a center of each of the M first operations;
  a detection unit, configured to detect whether there is a first operation; and
  a processing unit, configured to select an i-th first operation object from the M first operation objects in response to a first operation in the case where the first operation is detected and obtained, the first operation is detected by a sensor unit arranged in the display unit, where i is any integer between 1 and M; determine a second operating region based on a display position and a display direction of the i-th first operation object on the display unit; control to display the second operating region on the display unit, wherein N second operation objects are arranged on the second operating region, and a display direction of a q-th second operation object of the N second operation objects is identical to the display direction of the i-th first operation object, where N is an integer greater than or equal to 1, and q is an integer greater than or equal to 1 and less than or equal to N,
  wherein the display position of the i-th first operation object is a first display position and the display direction of the i-th first operation object is a first display direction in the case where the first operating region is located at a first position on the display unit; the display position of the i-th first operation object is a second display position and the display direction of the i-th first operation object is a second display direction in the case where the first operating region is located at a second position on the display unit, and the first display direction is different from the second display direction;
  wherein in a case that the display unit supports multi-touch, the detection unit is further configured to detect whether there is a second operation; and
  the processing unit is further configured to: select a j-th first operation object from the M first operation objects in response to the second operation in the case where the second operation is detected, wherein the j-th first operation object being adjacent to the i-th first operation object, j being any integer between 1 and M which is different from i, and the second operation is detected by the sensor unit; determine a fourth operating region based on a display position and a display direction of the j-th first operation object on the display unit; control to display the fourth operating region on the display unit, with S second operation objects being arranged at the fourth operating region, and a display direction of a k-th second operation object of the S second operation objects being identical to the display direction of the j-th first operation object, wherein the fourth operating region is not completely overlapped with the second operating region, S is an integer greater than or equal to 1, k is an integer greater than or equal to 1 and less than or equal to S,
  wherein the display position of the j-th first operation object is a third display position and the display direction of the j-th first operation object is a third display direction in the case where the first operating region is located at the first position; the display position of the j-th first operation object is a fourth display position and the display direction of the j-th first operation object is a fourth display direction in the case where the first operating region is located at the second position, and the third display direction is different from the fourth display direction.

16. The electronic device according to claim 15, wherein the processing unit is further configured to determine N preview areas respectively corresponding to the N second operation objects based on the display position and the display direction of each of the N second operation objects; and display the N preview areas, wherein at least one preview file corresponding to a corresponding one of the N second operation objects is displayed on each of the N preview areas.

17. The electronic device according to claim 16, wherein the detection unit is further configured to detect whether there is a third operation; and the processing unit is further configured to select a p-th second operation object from the N second operation objects in response to the third operation in the case where the third operation is detected, p being any integer between 1 and N; and control to change a preview area in the N preview areas corresponding to the p-th second operation into a selectable area.

18. The electronic device according to claim 15, wherein the detection unit is further configured to detect whether there is a fourth operation; and the processing unit is further configured to control to display a first operating region corresponding to the fourth operation on the display unit in response to the fourth operation in the case where the fourth operation is detected.

19. The electronic device according to claim 15, wherein processing unit comprises a first processing sub-unit, configured to select the i-th first operating object from the M first operating objects in response to the first operation in the case that the first operation is obtained, where i is any integer between 1 and M; determine a second operating region and N second operating objects based on the i-th first operating object, wherein the second operating region is different from the first operating region; and control to display the N second operating objects on the second operating region, wherein when the N second operating objects are displayed on the second operating region, each of the N second operating objects corresponds to a first operating sub-region, each first operating sub-region has a reference point, a connecting line of N reference points is a curve, and rules for determining the reference point on different first operating sub-regions are the same, where N is an integer greater than or equal to 1.

20. The electronic device according to claim 19, wherein the reference point on each first operating sub-region is:
a center point of each first operating sub-region; or
a point on each first operating sub-region which is furthest or nearest to a center of the first operating region; or
a top point of each first operating sub-region.

21. The electronic device according to claim 19, wherein the first processing sub-unit comprises a processing module configured to determine the N reference points, determine a trace corresponding to the curve, align the N reference points along the trace and display the N second operating objects.

22. The electronic device according to claim 19, wherein a distance between the curve and external borders of the first operating region meet a predetermined condition.

23. The electronic device according to claim 22, wherein a second operating sub-region is further formed on the second operating region, the second operating sub-region is located between the first operating region and the first operating sub-region, and the first processing sub-unit is further configured to display L third operating objects on the second operating sub-region after the second operating region is determined, where L is an integer greater than or equal to 1.

24. The electronic device according to claim 15, wherein the processing unit comprises a second processing sub-unit configured to select the i-th first operation object from the M first operation objects in response to the first operation, with i being any integer ranging from 1 to M; determine a second operation region and a third operation region based on the i-th first operation object; and to control the second operation region and the third operation region to be displayed by the display unit, wherein N second operation objects are arranged at the second operation region and L third operation objects are arranged at the third operation region, with N being an integer greater than or equal to 1 and L being an integer greater than or equal to 1 and less than or equal to N.

25. The electronic device according to claim 24, wherein the second operation region has a main region for displaying the second operation object corresponding to the selected third operation object, and after the second operation region and the third operation region are controlled to be displayed by the display unit:

the detection unit is further configured to detect and obtain a second operation, wherein the second operation is an operation to click the j-th third operation object of the L third operation objects; and the second processing sub-unit is further configured to select the j-th third operation object in response to the second operation, with j being any integer ranging from 1 to L; and to control the second operation object corresponding to the j-th third operation object to be displayed in the main region.

26. The electronic device according to claim 25, wherein the second processing sub-unit is further configured to control the j-th third operation object to be displayed with a first effect and control other third operation object of the L third operation objects other than the j-th third operation object to be displayed with a second effect, wherein the first effect is different from the second effect.

27. The electronic device according to claim 24, wherein the size of the third operation region is fixed and G third operation objects are displayed in the third operation region at a time, with G being an integer greater than or equal to 1, and wherein, in the case where L is larger than G, after the second operation region and the third operation region are displayed:

the detection unit is further configured to detect and obtain a third operation; and the second processing sub-unit is further configured to adjust the third operation objects displayed in the third display region in response to the third operation, wherein at least one operation object of the adjusted third operation objects is different from the third operation objects displayed in the third operation region before the adjustment, and the second operation objects displayed in the second operation region remain unchanged.

28. The electronic device according to claim 27, wherein, in the case where the third operation is a sliding operation and the i-th third operation object is slid, after in response to the third operation the second processing sub-unit is further configured to:

detect whether the sliding distance of the sliding operation on the display unit is larger than a predetermined value; and display again the third operation objects displayed in the third operation region before the adjustment in the third operation region if the sliding distance is larger than the predetermined value.

\* \* \* \* \*